US011134159B2

(12) United States Patent
Kubota et al.

(10) Patent No.: US 11,134,159 B2
(45) Date of Patent: Sep. 28, 2021

(54) SPECTRAL CHARACTERISTIC ACQUISITION DEVICE, IMAGE FORMING APPARATUS, AND IMAGE FORMING APPARATUS MANAGEMENT SYSTEM

(71) Applicants: Yoichi Kubota, Tokyo (JP); Yusuke Taneda, Kanagawa (JP); Kohei Shimbo, Kanagawa (JP)

(72) Inventors: Yoichi Kubota, Tokyo (JP); Yusuke Taneda, Kanagawa (JP); Kohei Shimbo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 185 days.

(21) Appl. No.: 16/442,716

(22) Filed: Jun. 17, 2019

(65) Prior Publication Data

US 2020/0007694 A1    Jan. 2, 2020

(30) Foreign Application Priority Data

Jun. 29, 2018   (JP) .............................. JP2018-125167

(51) Int. Cl.
*G01J 3/50* (2006.01)
*G01J 3/28* (2006.01)
*H04N 1/00* (2006.01)
*G01J 3/10* (2006.01)
*G01J 3/02* (2006.01)
(Continued)

(52) U.S. Cl.
CPC ........ *H04N 1/00087* (2013.01); *G01J 3/2823* (2013.01); *G01J 3/502* (2013.01); *H04N 1/00023* (2013.01)

(58) Field of Classification Search
CPC .. G01J 3/0208; G01J 3/027; G01J 3/10; G01J 3/24; G01J 3/2803; G01J 3/2823; G01J 3/502; G01J 3/524; H04N 1/00087; H04N 1/00023
See application file for complete search history.

(56) References Cited

U.S. PATENT DOCUMENTS 4,381,447 A * 4/1983 Horvath ................. G01N 21/89
                                                   250/223 R
2011/0063615 A1    3/2011  Shimbo et al.
(Continued)

FOREIGN PATENT DOCUMENTS

| JP | 2003-014546 | 1/2003 |
| JP | 2013-142644 | 7/2013 |
| JP | 2017-116388 | 6/2017 |

*Primary Examiner* — Hina F Ayub
(74) *Attorney, Agent, or Firm* — IPUSA, PLLC

(57) ABSTRACT

A spectral characteristic acquisition device according to one aspect of the disclosed technique includes: a color data acquirer comprising a plurality of spectral sensors receiving light reflected from an object irradiated with light and acquiring color data of the object; circuitry configured to estimate a spectral characteristic of the object on a basis of the color data and calibrate the spectral characteristic calculator on a basis of the color data obtained from a calibration color mark having a color mark of a known spectral characteristic; a first conveyer configured to convey the object in a predetermined conveyance direction and conveying the color data acquirer in a direction intersecting the predetermined conveyance direction; and a second conveyer configured to convey the calibration color mark in the predetermined conveyance direction.

14 Claims, 25 Drawing Sheets

(51) Int. Cl.
    *G01J 3/52*       (2006.01)
    *G01J 3/24*       (2006.01)

(56) References Cited

U.S. PATENT DOCUMENTS

| | | |
|---|---|---|
| 2011/0106472 A1 | 5/2011 | Seo et al. |
| 2011/0222056 A1 | 9/2011 | Seo et al. |
| 2011/0299104 A1 | 12/2011 | Seo et al. |
| 2011/0317149 A1 | 12/2011 | Shimbo et al. |
| 2013/0063723 A1 | 3/2013 | Shimbo et al. |
| 2013/0182251 A1 | 7/2013 | Shimbo et al. |
| 2013/0182256 A1 | 7/2013 | Kubota et al. |
| 2013/0235249 A1 | 9/2013 | Shimbo et al. |
| 2013/0235376 A1 | 9/2013 | Kamijo et al. |
| 2014/0333927 A1 | 11/2014 | Shimbo et al. |
| 2015/0049371 A1 | 2/2015 | Kamijo et al. |
| 2015/0253190 A1 | 9/2015 | Seo et al. |
| 2016/0156810 A1* | 6/2016 | Nakamura ......... H04N 1/00023 358/1.9 |
| 2018/0011435 A1* | 1/2018 | Tsubotani .......... G03G 15/2028 |
| 2018/0087966 A1* | 3/2018 | Gomi ....................... G01J 3/50 |
| 2018/0136118 A1* | 5/2018 | Kueny .................. G01N 21/73 |

* cited by examiner

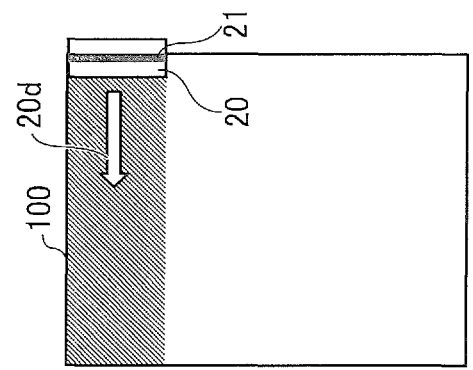
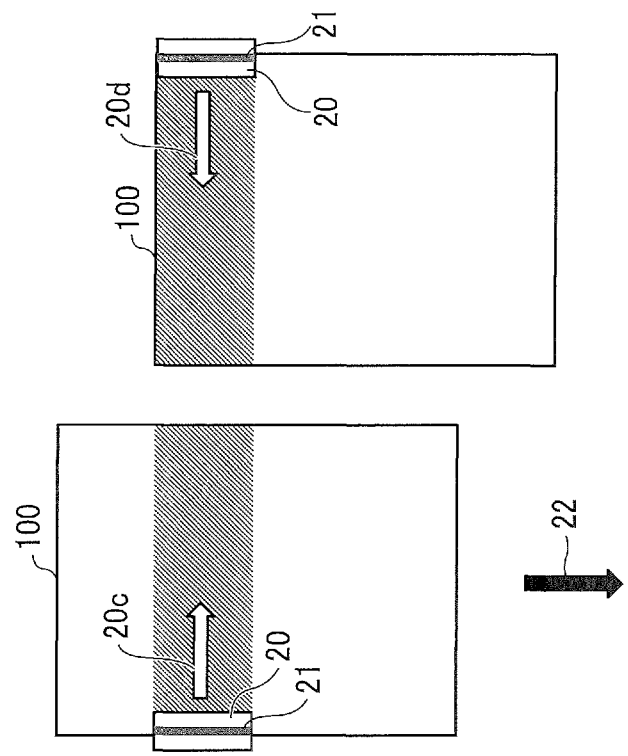
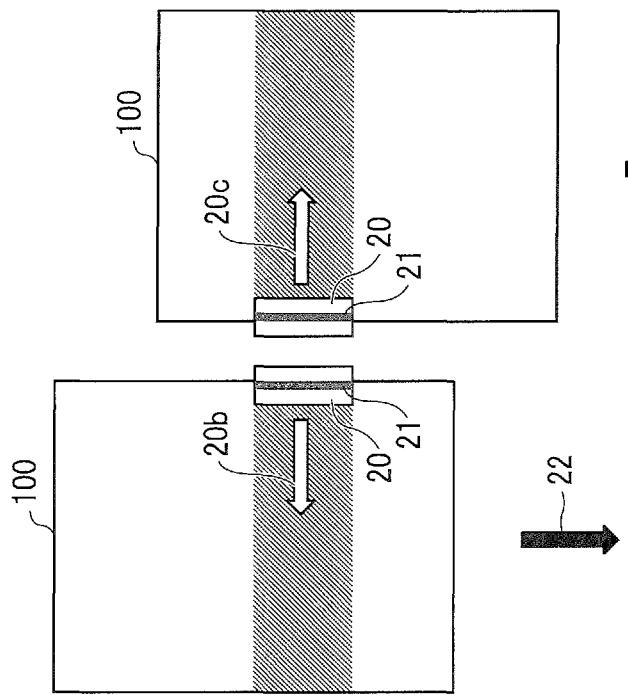
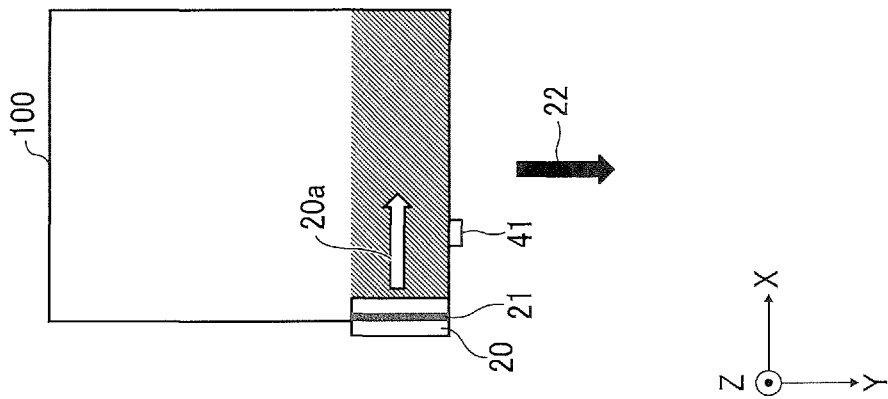

FIG. 19

| SPECTRAL SENSOR / COLOR MARK | $80_1$ | $80_2$ | $80_3$ | ... |
|---|---|---|---|---|
| $51b_1$ | L*a*b*... | L*a*b*... | L*a*b*... | ... |
| $51b_2$ | L*a*b*... | L*a*b*... | L*a*b*... | ... |
| $51b_3$ | L*a*b*... | L*a*b*... | L*a*b*... | ... |
| ⋮ | ⋮ | ⋮ | ⋮ | ⋮ |

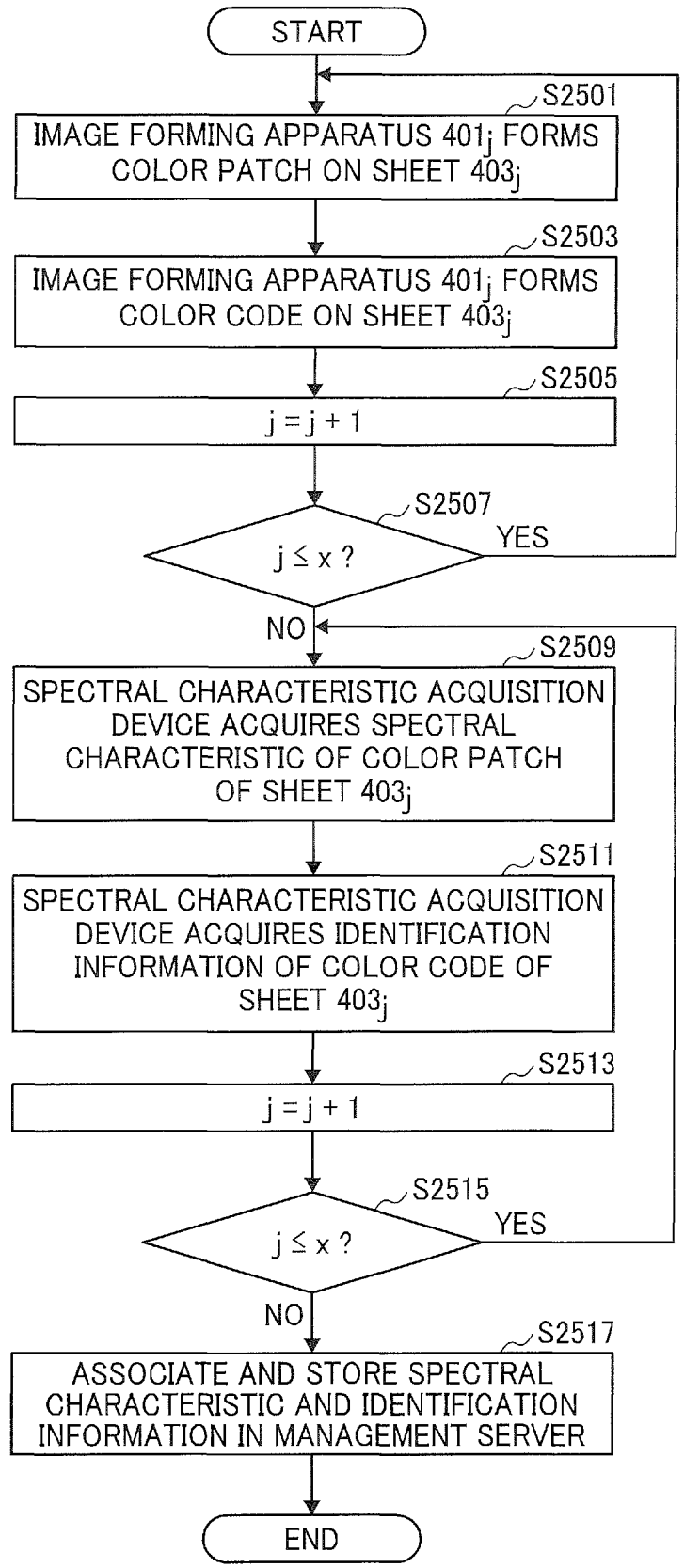

SPECTRAL CHARACTERISTIC ACQUISITION DEVICE, IMAGE FORMING APPARATUS, AND IMAGE FORMING APPARATUS MANAGEMENT SYSTEM

CROSS-REFERENCE TO RELATED APPLICATIONS

This patent application is based on and claims priority pursuant to 35 U.S.C. § 119(a) to Japanese Patent Application No. 2018-125167, filed on Jun. 29, 2018, in the Japan Patent Office, the entire disclosure of which is incorporated by reference herein.

BACKGROUND

Technical Field

Embodiments of the present disclosure relate to a spectral characteristic acquisition device, an image forming apparatus, and an image forming apparatus management system.

Description of the Related Art

In a full-color image forming apparatus (printer, copier, etc.), such as an electrophotographic image forming apparatus or an inkjet image forming apparatus, high image quality is required for color images formed on recording media, such as sheets, in recent years, and color reproducibility improvement is one of considerable technical issues.

SUMMARY

A spectral characteristic acquisition device according to one aspect of the present disclosure includes: a color data acquirer comprising a plurality of spectral sensors receiving light reflected from an object irradiated with light and acquiring color data of the object; circuitry configured to estimate a spectral characteristic of the object on a basis of the color data and calibrate the spectral characteristic calculator on a basis of the color data obtained from a calibration color mark having a color mark of a known spectral characteristic; a first conveyer configured to convey the object in a predetermined conveyance direction and conveying the color data acquirer in a direction intersecting the predetermined conveyance direction; and a second conveyer configured to convey the calibration color mark in the predetermined conveyance direction.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 7A to 7D (FIG. 7) are illustration of an example spectral characteristic acquisition operation according to an embodiment of the present disclosure;

FIG. 19 is a table representing color data of each color mark acquired by each spectral sensor according to the third embodiment;

FIG. 25 is a flowchart of a management process according to the second embodiment.

Figure 1:
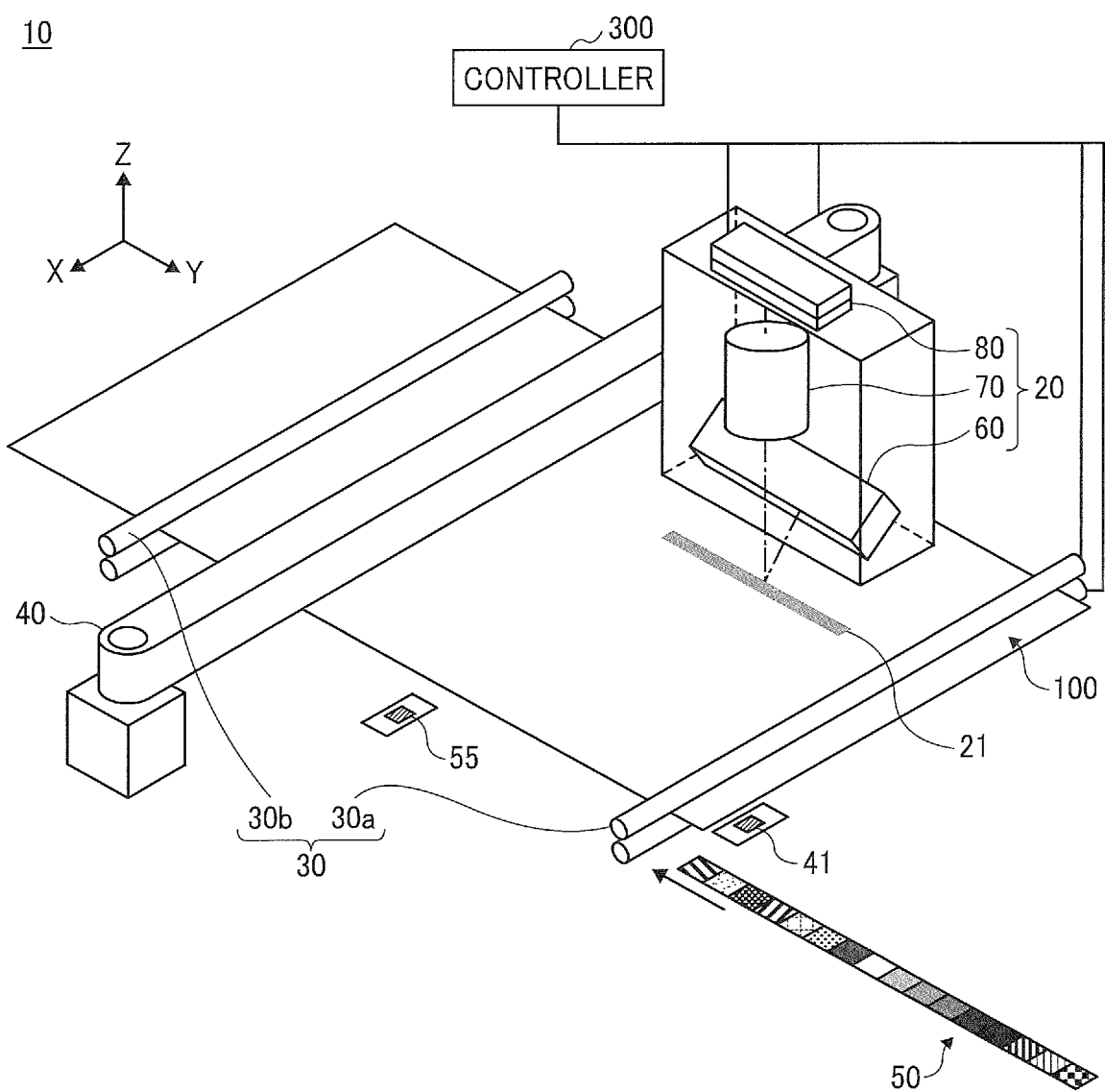
FIG. 1 is an illustration of an example configuration of a spectral characteristic acquisition device according to a first embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, an embodiment of the invention will be described with reference to the drawings. In the drawings, same components may be denoted by same reference symbols and a redundant description may be omitted.

In the description of the embodiments, an example in which an object whose spectral characteristic is to be acquired is an image carrying medium such as a sheet is illustrated, and the object whose spectral characteristic is to be acquired is simply referred to as a sheet. In addition, there is a drawing in which a direction is indicated by an arrow; an X direction indicates a sheet width direction, a Y direction indicates a sheet conveyance direction, and a Z direction indicates a direction perpendicular to an XY plane. The X direction is an example of the "direction intersecting with the predetermined conveyance direction", and the Y direction is an example of the "predetermined conveyance direction".

In the embodiment, terms such as "image forming", "recording", "print", "imaging", and "printing" are treated as synonymous terms.

First Embodiment

First, a first embodiment will be described with reference to the drawings. FIG. 1 is a diagram explaining an example of a configuration of a spectral characteristic acquisition device according to the present embodiment. A spectral characteristic acquisition device 10 simultaneously acquires a spectral characteristic of different areas in a Y direction of a sheet 100 in a color data acquisition area 21.

As illustrated in FIG. 1, the spectral characteristic acquisition device 10 includes a color data acquirer 20, a sheet conveyer 30, a color data acquirer conveyer 40, a sheet detection sensor 41, a calibration color mark 50, and a controller 300. In addition, the color data acquirer 20 includes a line illumination light source 60, a reduction imaging lens 70, and a spectral unit 80.

The sheet conveyer 30 conveys the sheet 100 at a predetermined speed in the Y direction. The sheet conveyer 30 includes, for example, a drive roller 30a and a driven roller 30b. The drive roller 30a is a nip roller including two rollers. The driven roller 30b is also a nip roller including two rollers.

The two rollers included in the drive roller 30a can be respectively rotated by a connected motor. As illustrated, the drive roller 30a nips the sheet 100 with a nip roller, and rotates the nip roller to convey the sheet 100 in the Y direction. By switching a rotation direction of the drive roller 30a, a conveyance direction can be switched to a positive Y direction or a negative Y direction.

The driven roller 30b nips the sheet 100 with a nip roller, and rotates as the sheet 100 is conveyed by the drive roller 30a. By nipping and conveying the sheet 100 with the use of the drive roller 30a and the driven roller 30b, tension is applied to the sheet 100 to be conveyed, and a surface of the sheet 100 facing the color data acquirer 20 can be made flat.

In addition, the drive roller 30a can nip the calibration color mark 50 with a nip roller, and rotate the nip roller to convey the calibration color mark 50 in the Y direction. Details of a conveyance of the calibration color mark 50 by the drive roller 30a will be separately described.

The color data acquirer conveyer 40 conveys the color data acquirer 20 in the X direction. The color data acquirer conveyer 40 is, for example, a conveyance stage including a ball screw, a guide, or the like connected to the motor.

The color data acquirer 20 is an example of the "color data acquirer". The color data acquirer conveyer 40 is an example of the "first conveyer". The sheet conveyer 30 is an example of the "third conveyer". The drive roller 30a is an example of the "second conveyer".

The sheet 100 may be conveyed in the Y direction with the use of the drive roller 30a. In addition, the calibration color mark 50 may be conveyed in the Y direction with the use of both the drive roller 30a and the driven roller 30b. The sheet 100 and the calibration color mark 50 may be conveyed in the Y direction with the use of a common conveyer.

The sheet detection sensor 41 detects that the sheet 100 is at a position of the color data acquisition area 21 and thus detects a timing when acquisition of a spectral characteristic is started by the spectral characteristic acquisition device 10. Alternatively, an end timing of spectral characteristic acquisition by the spectral characteristic acquisition device 10 may be detected. In addition, two sheet detection sensors 41 may be provided at different positions in the Y direction, and timings of both start and end of spectral characteristic acquisition by the spectral characteristic acquisition device 10 may be detected.

The sheet detection sensor 41 is installed at a position associated with the color data acquisition area 21 in the Y direction, and includes, for example, a light source that emits light in a positive Z direction and a photodiode that receives the reflected light from the sheet 100 and outputs an electrical signal according to the received light intensity.

When the sheet 100 is in the positive Z direction of the sheet detection sensor 41, the photodiode can receive the light reflected by the sheet 100 of the light emitted from the light source. However, when the sheet 100 is not in the positive Z direction of the sheet detection sensor 41, the photodiode is not able to receive the light reflected by the sheet 100. Therefore, the sheet detection sensor 41 can detect whether the sheet 100 is at the position of the color data acquisition area 21 on the basis of an output of the photodiode.

The calibration color mark 50 is used when calibrating a conversion matrix G used to calculate a spectral characteristic. In the calibration, the color data acquirer conveyer 40 conveys the color data acquirer 20 to a position where the calibration color mark 50 is placed. In addition, the drive roller 30a conveys the calibration color mark 50 in the Y direction, and the color data acquirer 20 acquires color data of the calibration color mark 50. Such calibration will be described in detail separately.

A calibration color mark detection sensor 55 detects that the calibration color mark 50 is not at the position of the color data acquisition area 21 and thus detects an end timing of the calibration using the calibration color mark 50. Alternatively, a timing of a start of the calibration may be detected. In addition, two calibration color mark detection sensors 55 may be provided at different positions in the Y direction, and timings of both start and end of the calibration may be detected.

The calibration color mark detection sensor 55 is installed at a position associated with the color data acquisition area 21 in the Y direction, and includes, for example, a light source that emits light in a positive Z direction and a photodiode that receives the reflected light from the calibration color mark 50 and outputs an electrical signal according to the received light intensity.

When the calibration color mark 50 is in the positive Z direction of the calibration color mark detection sensor 55, the photodiode can receive the light reflected by the calibration color mark 50 of the light emitted from the light source. However, when the calibration color mark 50 is not in the positive Z direction of the calibration color mark detection sensor 55, the photodiode is not able to receive the light reflected by the calibration color mark 50. Therefore, the calibration color mark detection sensor 55 can detect whether the calibration color mark 50 is at the position of the color data acquisition area 21 on the basis of an output of the photodiode.

The line illumination light source 60 illuminates the color data acquisition area 21 with line-shaped light from a direction inclined by about 45 degrees with respect to a normal direction of the sheet 100. In addition, the line illumination light source 60 illuminates an appropriate area with respect to the color data acquisition area 21 in such a manner that the reflected light from an area other than the color data acquisition area 21 of the sheet 100 does not enter the spectral unit 80.

As the line illumination light source 60, for example, a white Light Emitting Diode (LED) array having an intensity over a substantially entire visible light may be used. However, the configuration is not limited to this, and a fluorescent lamp such as a cold cathode tube or a lamp light source may be used as the line illumination light source 60.

It is preferable that the line illumination light source 60 emits light in a wavelength range required for spectroscopy and can uniformly illuminate throughout the color data acquisition area 21. A collimator lens that condenses the light emitted from the line illumination light source 60 and irradiates the sheet 100 with parallel light or convergent light may be added.

The reduction imaging lens 70 is disposed in such a manner that an optical axis coincides with the normal direction of the sheet 100, and includes a function to image, the reflected light from the sheet 100, that is, a reflected light beam, on an incident surface of the spectral unit 80 at a predetermined magnification. Here, by adding an image-side telecentric characteristic to the reduction imaging lens 70, a chief ray of the light beam incident on an image plane becomes substantially parallel to the optical axis. The reduction imaging lens 70 may include a plurality of lenses.

By adding the image-side telecentric characteristic to the reduction imaging lens 70, the chief ray of the light beam incident on the image plane can be easily made substantially parallel to the optical axis; however, it is unnecessary to add the image-side telecentric characteristic to the reduction imaging lens 70. In that case, a same effect can be obtained by adjusting relative positions between each pinhole of a pinhole array and each lens of a lens array that will be described later in accordance with an inclination of the chief ray at each position on the image plane.

The spectral unit 80 includes a function to separate diffused reflection light of the light irradiated to the sheet 100 and a function to output a signal obtained by receiving the separated light. The spectral unit 80 will be described in detail with reference to FIG. 2.

An optical system illustrated in FIG. 1 is a so-called 45/0 optical system in which illumination light emitted from the line illumination light source 60 is incident on the sheet 100 at an oblique angle of about 45 degrees, and the spectral unit 80 receives light diffusely reflected from the sheet 100 in a vertical direction. However, a configuration of the optical system is not limited to the optical system illustrated in FIG. 1, and a so-called 0/45 optical system in which illumination light emitted from the line illumination light source 60 is vertically incident on the sheet 100 and the spectral unit 80 receives light diffused from the sheet 100 in a 45 degree direction may be used.

Figure 2:
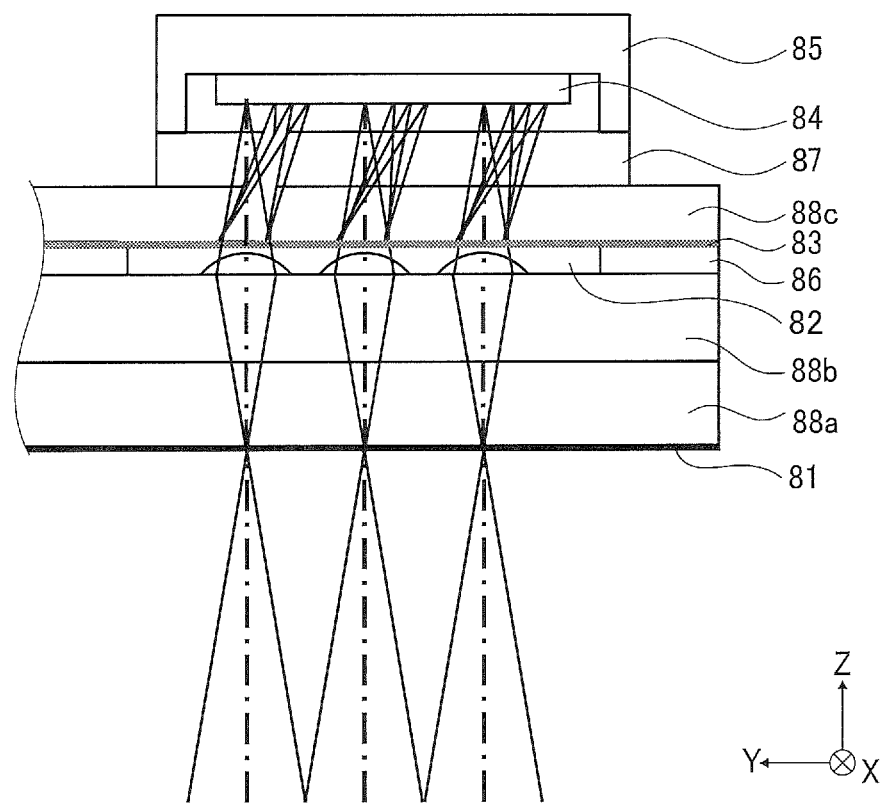
FIG. 2 is an illustration of an example configuration of a spectral unit according to an embodiment of the present disclosure.

Next, a configuration of the spectral unit 80 will be described with reference to FIG. 2. FIG. 2 is a cross-sectional view illustrating the spectral unit of the first embodiment, and illustrates a part of a cross section parallel to a YZ plane of the spectral unit.

In FIG. 2, the spectral unit 80 includes a pinhole array 81, a lens array 82, a diffraction element 83, and an image sensor 84. The spectral unit 80 also includes a package 85, a spacer 86, a cover glass 87, and glass base materials 88a to 88c.

The pinhole array 81 includes pinholes as openings through which reflection from the sheet 100 passes. The pinholes are arranged at an image plane position where light incident from the reduction imaging lens 70 forms an image in the Z direction, and are arrayed in the Y direction at a predetermined interval. FIG. 2 illustrates an example in which three pinholes are arrayed in the Y direction.

The pinhole array 81 is integrally provided on a transparent flat glass base material 88a that is as a light transmitting frame. A thin metal film such as nickel is deposited on a transparent glass base material, and openings corresponding to the pinholes are provided in an array to form the pinhole array 81. A light beam of reflected light from each position of the color data acquisition area 21 of the sheet 100 is extracted by each pinhole provided in the pinhole array 81.

In addition, the configuration is not limited to the pinhole array 81, a configuration including a slit array having a rectangular opening, or a configuration including a diagonal slit array for which a rectangular slit is inclined with respect to the Y direction may be employed.

In the glass base material 88a, a transparent flat glass base material 88b that is as a light transmitting frame is bonded to a surface opposite to the surface on which the reflected light from the sheet 100 is incident. In addition, in the glass base material 88b, lenses are provided on a surface opposite to the bonding surface with the glass base material 88a so as to be arrayed in the Y direction at a predetermined interval. FIG. 2 illustrates an example in which three lenses are arrayed in the Y direction to form the lens array 82. Each lens of the lens array 82 condenses each light beam that is passed through each pinhole of the pinhole array 81, and forms an image by each lens on the image sensor 84.

The lens array 82 has a plurality of lenses arrayed in one row in the Y direction, and each lens of the lens array 82 includes a function to convert each diffused beam passing through each opening of the pinhole array 81 into a weakly diffused light beam.

The weakly diffused light beam means a diffused light beam more similar to a parallel light beam than an incident diffused light beam. That is, the weakly diffused light beam is a diffused light beam whose degree of diffusion is smaller than that of the incident diffused light beam, that is, a weakened light beam.

Each lens included in the lens array 82 is disposed at a position corresponding to each opening included in the pinhole array 81. Each lens has a diameter such that all light transmitted through each opening is incident. However, a planar shape of each lens may not be circular.

In the present embodiment, the pinhole array 81 and the lens array 82 are disposed via the glass base materials 88a and 88b, but the configuration is not limited to this. Thicknesses of the glass base materials 88a and 88b are determined in such a manner that an optical path length between the pinhole array 81 and the lens array 82 is shorter than an object-side focal length of each lens of the lens array 82. In the lens array 82, in order to eliminate stray light, it is preferable to shield a portion other than the opening of each lens.

A transparent flat glass base material 88c that is as a light transmitting frame is provided so to face the lens array 82 in the Z direction. The glass base material 88b and the glass base material 88c are bonded via the spacer 86.

The spacer 86 is a member for providing a predetermined interval, i.e., a space, between the glass base material 88b and the glass base material 88c, and is, for example, a member in which a predetermined through hole is provided in a flat portion of a metal flat plate. In a surface of the spacer 86 on a side facing the lens array 82, a portion not corresponding to the through hole of the spacer 86 and a portion without the lens of the glass base material 88b are in contact and bonded.

In addition, in a surface of the spacer 86 on a side facing the diffraction element 83, a portion not corresponding to the through hole of the spacer 86 and an arbitrary portion of the glass base material 88c are in contact and bonded. With this, a predetermined interval, i.e., a space can be provided between the glass base material 88b and the glass base material 88c. The through hole may be provided with a small hole in which each lens of the lens array 82 can be housed, or may be provided with a large hole in which a plurality of lenses can be housed.

The diffraction element 83 is provided on a surface of the glass base material 88c facing the lens array 82, that is, a surface on which the reflected light from the sheet 100 is incident. The diffraction element 83 has a sawtooth shape with a predetermined interval formed on the glass base material 88c, and includes a function as a diffraction grating that diffracts and disperses incident light. The diffraction element 83 disperses each light beam transmitted through each lens of the lens array 82. A diffraction image corresponding to each light beam is formed on the image sensor 84.

As the diffraction element 83, it is preferable to use a blazed diffraction grating in which diffraction efficiency of first-order diffracted light is enhanced. By using a blazed diffraction grating as the diffraction element 83, it is possible to enhance the diffraction efficiency of just first-order diffracted light, and thus it is possible to increase light utilization efficiency of the optical system. With this, a signal having sufficient quality can be obtained in a short time, and a time for acquiring spectral characteristic can be shortened.

The image sensor 84 is a line sensor in which a plurality of pixels are arrayed in the Y direction. The image sensor 84 receives each diffraction image formed by the lens array 82 and the diffraction element 83 with a plurality of light receiving elements at respective different positions, thereby acquiring light-intensity of an incident predetermined wavelength band. For example, a metal oxide semiconductor device (MOS), a complementary metal oxide semiconductor device (CMOS), a charge coupled device (CCD) or the like can be used as the image sensor 84.

Figure 3:
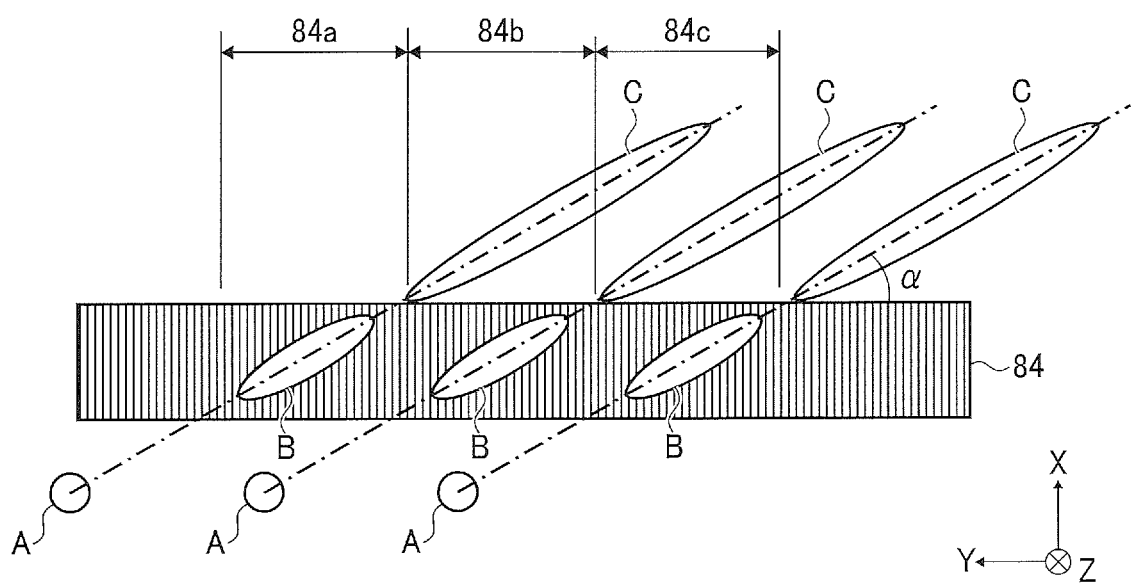
FIG. 3 is an illustration of a diffraction image and light reception by an image sensor according to an embodiment of the present disclosure.

A diffraction axis of the diffraction element 83 is inclined at an angle α with respect to the Y direction. As illustrated in FIG. 3, a diffraction image inclined by an angle α with respect to the X direction is incident on the image sensor 84. FIG. 3 illustrates three diffraction patterns comprised of a zero-order diffraction image A, a+1st-order diffraction image B, and a+2nd-order diffraction image C in the Y direction.

Of the diffraction patterns, the 1st-order diffraction image B is arranged to be received by the image sensor 84. In an example of FIG. 3, pixel areas 84a, 84b, and 84c of the image sensor 84 receive three 1st-order diffraction images by three lens arrays and convert the images into an electrical signal. The image sensor 84 outputs the converted electrical signal as color data acquired by the spectral unit 80.

As described above, in the spectral characteristic acquisition device 10, a crosstalk of the diffraction image is eliminated, and it is possible to obtain a spectral characteristic of the sheet 100 from the +1st-order diffraction image B. In the following description, the +1st-order diffraction image B may be simply referred to as a diffraction image.

The image sensor 84 is fixed inside the package 85, and an opening of the package 85 is closed with a transparent cover glass 87 that is as a light transmitting frame. The cover glass 87 is bonded to a surface of the glass base material 88c on which the diffraction element 83 is not formed.

One pinhole of the pinhole array 81 and one lens of the lens array 82 corresponding to this, a part of the diffraction element 83, that is, a light beam transmitting portion by the lens, and a pixel array of a part of the image sensor 84 form a function of one spectroscope. Therefore, a part having the function of one spectroscope may be hereinafter referred to as a spectral sensor.

While three spectral sensors are illustrated in FIGS. 2 and 3, the configuration is not limited to this, and a configuration having a large number of spectral sensors may be employed. For example, in a case where the image sensor 84 including 1024 pixels is used and a number of pixels in the above-mentioned partial pixel array is 10 pixels, 102 spectral sensors can be configured. Such spectral sensors are arranged in the sheet conveyance direction (Y direction). The spectral sensors arranged in the sheet conveyance direction (Y direction) are an example of the "a plurality of spectral sensors".

In an optical system for spectroscopy included in the spectral unit 80, relative positional deviations of the pinhole array 81, the lens array 82 and the diffraction image formed by the diffraction element 83 and the image sensor 84 greatly affect acquisition accuracy of a spectral characteristic. In the present embodiment, in order to suppress these positional deviations, the pinhole array 81, the lens array 82, the diffraction element 83, and the image sensor 84 are stacked in an optical axis direction of the reduction imaging lens 70 and bonded to be integrated.

Figure 4:
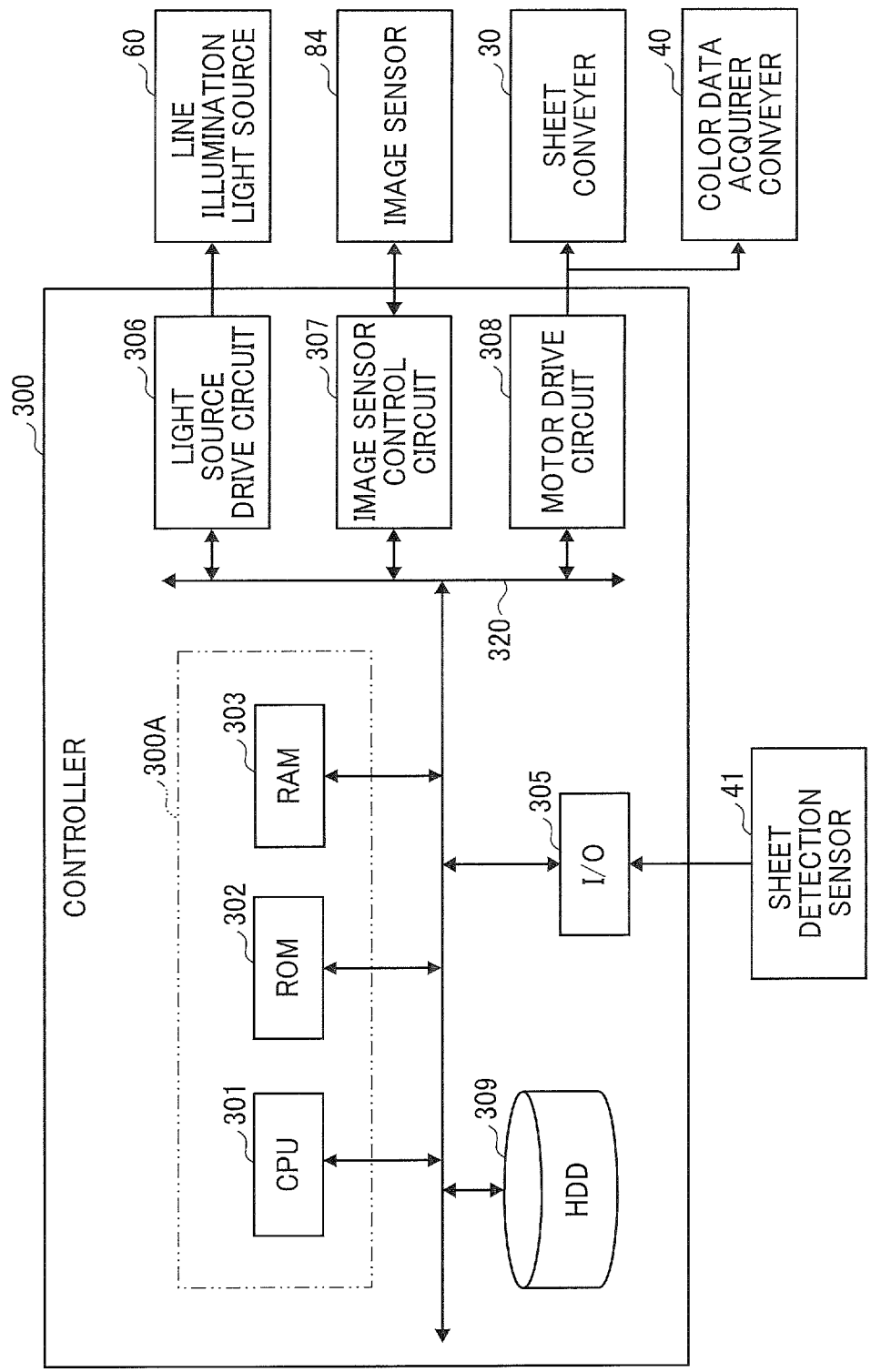
FIG. 4 is a hardware block diagram of the spectral characteristic acquisition device according to an embodiment of the present disclosure.

Next, the controller 300 of the spectral characteristic acquisition device 10 will be described with reference to FIGS. 4 and 5. FIG. 4 is a block diagram illustrating an example of a hardware configuration of the controller 300 according to the present embodiment.

The controller 300 includes a main controller 300A, an Input/Output (I/O) 305, a light source drive circuit 306, an image sensor control circuit 307, a motor drive circuit 308, and a Hard Disk Drive (HDD) 309.

The main controller 300A includes a central processing unit (CPU) 301, a read only memory (ROM) 302, and a random access memory (RAM) 303. These are electrically connected to one another via a system bus 320.

The CPU 301 centrally controls an operation of the spectral characteristic acquisition device 10. The CPU 301 executes a program stored in the ROM 302 or the like with the RAM 303 as a work area, thereby controlling an overall operation of the spectral characteristic acquisition device 10 to implement various functions that will be described later. The HDD 309 stores the acquired color data and the like.

The I/O 305 is an interface that inputs a signal detected by the sheet detection sensor 41, or the like.

The light source drive circuit 306 is an electric circuit that outputs a drive signal such as a drive voltage for causing the line illumination light source 60 to emit light in accordance with an input control signal.

The image sensor control circuit 307 is an electric circuit that outputs a drive signal such as a drive voltage for controlling imaging by the image sensor 84 in accordance with an input control signal. The imaging data by the image sensor 84 is transmitted to the HDD 309 as color data through the image sensor control circuit 307 and stored.

The motor drive circuit 308 is an electric circuit that outputs a drive signal such as a drive voltage to each motor included in the sheet conveyer 30 and the color data acquirer conveyer 40 in accordance with an input control signal.

The controller 300 implements a function to estimate and compute the spectral characteristic of the sheet 100 with the use of the conversion matrix G on the basis of the acquired color data. In addition, the controller 300 also implements a function to acquire a spectral characteristic by the spectral characteristic acquisition device 10 and a function to calibrate with the use of the abovementioned hardware configuration.

A part or all of the control process performed by the CPU 301 may be carried out by an electronic circuit such as a field-programmable gate array (FPGA) or an application specific integrated circuit (ASIC).

Figure 5:
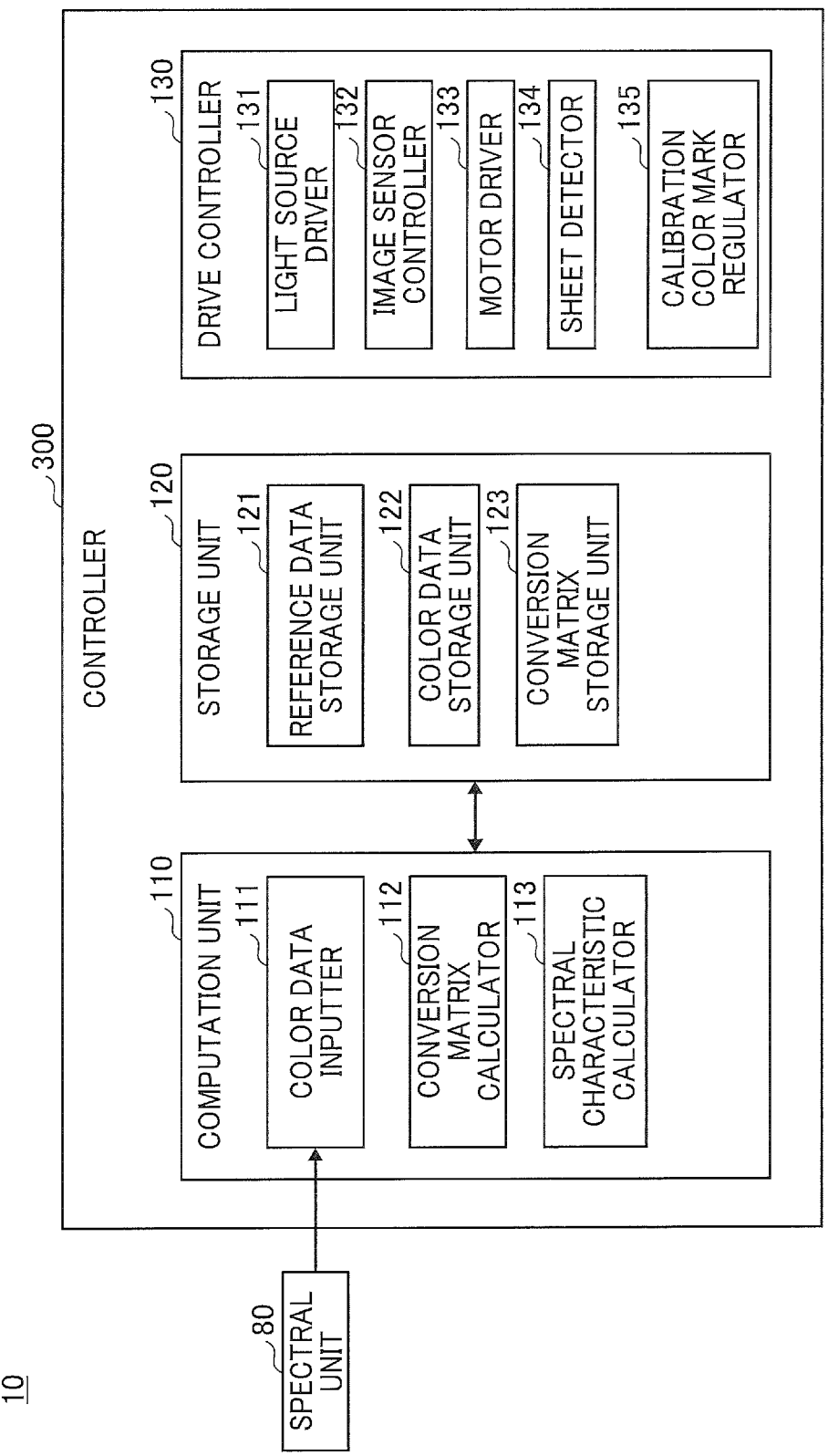
FIG. 5 is a functional block diagram of example components of a controller according to the first embodiment.

FIG. 5 is a diagram illustrating an example of components of the controller 300 according to the present embodiment by functional blocks. Each functional block of the controller 300 illustrated in FIG. 5 is conceptual and does not necessarily have to be physically configured as illustrated. All or part of each functional block can be configured by being functionally or physically distributed/connected in an arbitrary unit. Each process function performed in each functional block of the controller 300 may be implemented by a program executed by the above-described CPU 301 in whole or any part thereof, or may be implemented as wired logic hardware.

The controller 300 includes a computation unit 110, a storage unit 120, and a drive controller 130. The computation unit 110 includes a color data inputter 111, a conversion matrix calculator 112, and a spectral characteristic calculator 113. In addition, the storage unit 120 includes a reference data storage unit 121, a color data storage unit 122, and a conversion matrix storage unit 123. Hereinafter, a function of respective units included in the computation unit 110 will be described, and a method for estimating and computing a spectral reflectance distribution as the spectral characteristic of the sheet 100 will be described.

In the spectral characteristic acquisition device 10, when light is irradiated from the line illumination light source 60 to the sheet 100, the image sensor 84 of the spectral unit 80 that has received a diffraction image outputs an electrical signal according to light intensity. The color data inputter 111 of the controller 300 inputs as color data an electrical signal output from the image sensor 84.

When color data is input from the spectral unit 80, the spectral characteristic calculator 113 uses the conversion matrix G stored in advance in the conversion matrix storage unit 123 to calculate the spectral characteristic of the sheet 100 from the color data. The spectral characteristic calculator 113 is an example of the "spectral characteristic calculator".

In the present embodiment, a method will be described in which the spectral characteristic calculator 113 estimates and computes a spectral reflectance distribution as a spectral characteristic from color data by one spectral sensor included in the spectral unit 80. The spectral characteristic is not limited to the method described below and may be obtained by a different method.

Color data vi (i=1 to N) is obtained from N pixels included in one spectral sensor of the spectral unit 80 and is stored in a matrix V. A matrix r storing spectral reflectance of each wavelength band (for example, 31 of 10 nm pitch at 400 to 700 nm) is expressed by a following formula (1) with the use of the matrix V and the conversion matrix G.

$$r \quad (1)$$

As indicated in following formulae (2) to (4), the conversion matrix G is obtained from a matrix R storing spectral reflectance distributions of a plurality of (n) reference samples that are known and a matrix V storing spectral sensor color data v obtained from the reference samples by minimizing a squared norm $\|\cdot\|^2$ of an error with the use of a least squares method.

$$R \quad (2)$$

$$V \quad (3)$$

$$e = \|R - GV\|^2 \to \min \quad (4)$$

The conversion matrix G of a regression equation from V to R with V as an explanatory variable and R as an objective variable is obtained from a following formula (5), with the use of, for example, a generalized inverse matrix of Moore-Penrose giving a least squares norm solution of the matrix V. In the formula (5), a superscript T represents a transpose of a matrix, and a superscript −1 represents an inverse matrix.

$$G = RV^T(VV^T) \quad (5)$$

In the spectral characteristic acquisition device 10, an acquisition result of the spectral reflectance of the reference sample is stored in advance in the reference data storage unit 121 of the controller 300.

The conversion matrix calculator 112 generates a matrix $V_{ref}$ on the basis of the color data obtained from the reference sample in the spectral characteristic acquisition device 10. In addition, the matrix $R_{ref}$ is generated from the spectral reflectance distribution of the reference sample stored in the reference data storage unit 121. The conversion matrix calculator 112 calculates the conversion matrix G on the basis of the formula (5) from the matrices $V_{ref}$ and $R_{ref}$ generated in this manner.

The conversion matrix G calculated by the conversion matrix calculator 112 is stored in the conversion matrix storage unit 123. In addition, the matrix $V_{ref}$ of the color data obtained from the reference sample in the spectral characteristic acquisition device 10 is stored in the color data storage unit 122 of the controller 300.

When estimating the spectral characteristic of the sheet 100, the spectral characteristic calculator 113 first generates a matrix $V_{exp}$ from the color data of the sheet 100, and acquires the conversion matrix G stored in the conversion matrix storage unit 123. The spectral characteristic calculator 113 can estimate the spectral characteristic $R_{exp}$ of the sheet 100 on the basis of the formula (2) with the use of the matrix $V_{exp}$ and the conversion matrix G.

In the abovementioned estimation computation, it is preferable that a plurality of reference samples used to calculate the conversion matrix G be selected from a color range (gamut) that can be reproduced by a print image in, for example, a color space such as an XYZ color system or L*a*b* color system. By using the conversion matrix G calculated on the basis of such reference samples, for example, it is possible to estimate a spectral characteristic of an image of the sheet 100 with high accuracy.

However, the reference samples require much time and cost for preparation, maintenance and measurement. Therefore, it is preferable that the conversion matrix G be obtained on the basis of a small number of reference samples within a range in which estimation accuracy of a spectral characteristic can be maintained.

Figure 6:
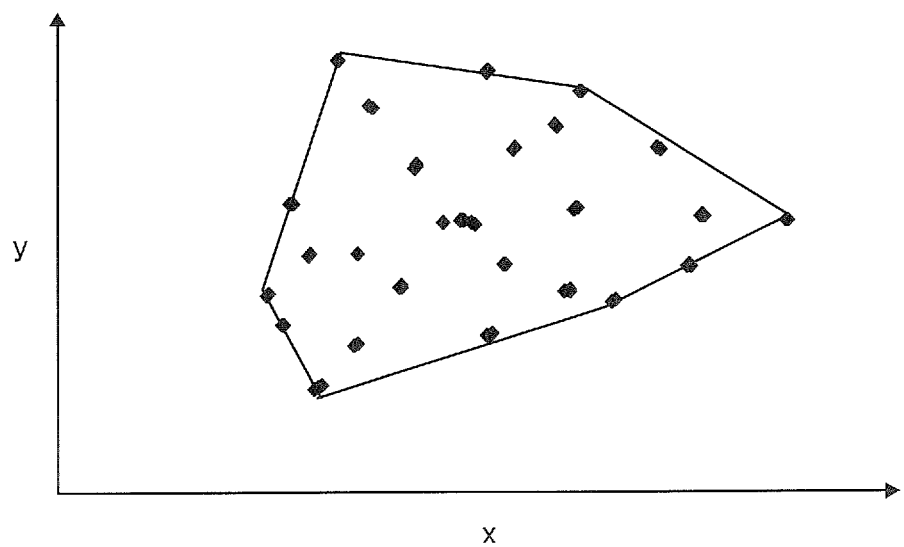
FIG. 6 is an example of an xy chromaticity distribution of a reference sample and a color reproduction range of a toner image.

As an example of the reference samples, it is possible to use toner images of 27 colors which are uniformly selected from a color reproducible range of an electrophotographic image forming apparatus. FIG. 6 illustrates an xy chromaticity of each of the 27 color reference samples. Each point indicates the xy chromaticity of the reference samples, and a solid line indicates a color reproduction range of a toner image. FIG. 6 illustrates that the reference samples are uniformly selected from the color reproduction range of the toner image.

In the spectral characteristic acquisition device 10, the conversion matrix G calculated by the conversion matrix calculator 112 is stored in advance in the conversion matrix storage unit 123 with the use of such reference samples.

Referring back to FIG. 5, the drive controller 130 includes a light source driver 131, an image sensor controller 132, a motor driver 133, a sheet detector 134, and a calibration color mark regulator 135.

The light source driver 131 is implemented by the light source drive circuit 306 or the like, and drives the line illumination light source 60. The image sensor controller 132 is implemented by the image sensor control circuit 307 or the like, and controls imaging by the image sensor 84 of the spectral unit 80. The motor driver 133 is implemented by the motor drive circuit 308 or the like, and drives each motor provided in the sheet conveyer 30 and the color data acquirer conveyance means 40.

The sheet detector 134 detects that the sheet 100 is at a position of the color data acquisition area 21 and thus detects a timing when acquisition of a spectral characteristic is started by the spectral characteristic acquisition device 10, or the like. The sheet detector 134 is achieved by, for example, the sheet detection sensor 41 or the like.

A calibration color mark regulator 135 detects that the calibration color mark 50 is not at the position of the color data acquisition area 21 and thus detects an end timing or the like of the calibration using the calibration color mark 50. The calibration color mark regulator 135 is implemented by, for example, the calibration color mark detection sensor 55 or the like.

When detecting that the calibration color mark 50 is not at the position of the color data acquisition area 21, the calibration color mark regulator 135 stops the calibration color mark 50 conveyed by the drive roller 30a. As described above, a function to regulate the conveyance of the calibration color mark in the Y direction is also included. The calibration color mark regulator 135 is an example of the "regulator".

Next, an example of an operation of spectral characteristic acquisition according to the present embodiment will be described with reference to FIGS. 7A to 7D. FIGS. 7A to 7D are plan views of the sheet 100 as viewed from the positive Z direction when color data is acquired. FIGS. 7A to 7D are views explaining an operation of the color data acquirer 20 at each position of the sheet 100 conveyed in the direction (positive Y direction) indicated by an arrow 22.

In FIG. 7A, the color data acquirer 20 is located at a negative X direction end and at a positive Y direction end of the sheet 100. The color data acquirer 20 is conveyed in a direction of a white arrow 20a from a position indicated in FIG. 7A. During conveyance of the color data acquirer 20, the spectral unit 80 acquires color data of the sheet 100 in the color data acquisition area 21 at a predetermined time interval. The predetermined time interval is, for example, a frame period of the image sensor 84. When the spectral unit 80 acquires color data, the sheet 100 is at rest. The color data acquirer 20 is conveyed to the positive X direction end of the sheet 100 and stops.

Since the spectral unit 80 is included in the color data acquirer 20, "acquisition of color data by the spectral unit 80" is synonymous with "acquisition of color data by the color data acquirer 20".

In the relative positions between the sheet 100 and the sheet detection sensor 41 illustrated in FIG. 7A, the sheet detection sensor 41 detects that the sheet 100 is at a position at which color data is acquired.

FIG. 7B illustrates a state after the sheet 100 is conveyed in the Y direction by a predetermined amount from a position of FIG. 7A. The predetermined amount is, for example, a length corresponding to a color data acquisition range in the Y direction by the spectral unit 80. In FIG. 7B, the color data acquirer 20 is located at the positive X direction end of the sheet 100.

The color data acquirer 20 is conveyed in a direction of a white arrow 20b from a position indicated in FIG. 7B. During conveyance of the color data acquirer 20, the spectral unit 80 acquires color data of the sheet 100 in the color data acquisition area 21 at a predetermined time interval. In a manner similar to that above, when the spectral unit 80 acquires color data, the sheet 100 is at rest. The color data acquirer 20 is conveyed to the negative X direction end of the sheet 100 and stops.

The spectral unit 80 acquires color data of the sheet 100 in the color data acquisition area 21 by a same operation with regard to FIGS. 7C and 7D.

By the above operation, color data in an entire area of the sheet 100 is acquired. In the above description, while an example in which the color data acquirer 20 is conveyed four times in the X direction to acquire color data in the entire area of the sheet 100, a number of conveyances may be arbitrarily set in accordance with a size of the sheet 100.

Figure 8:
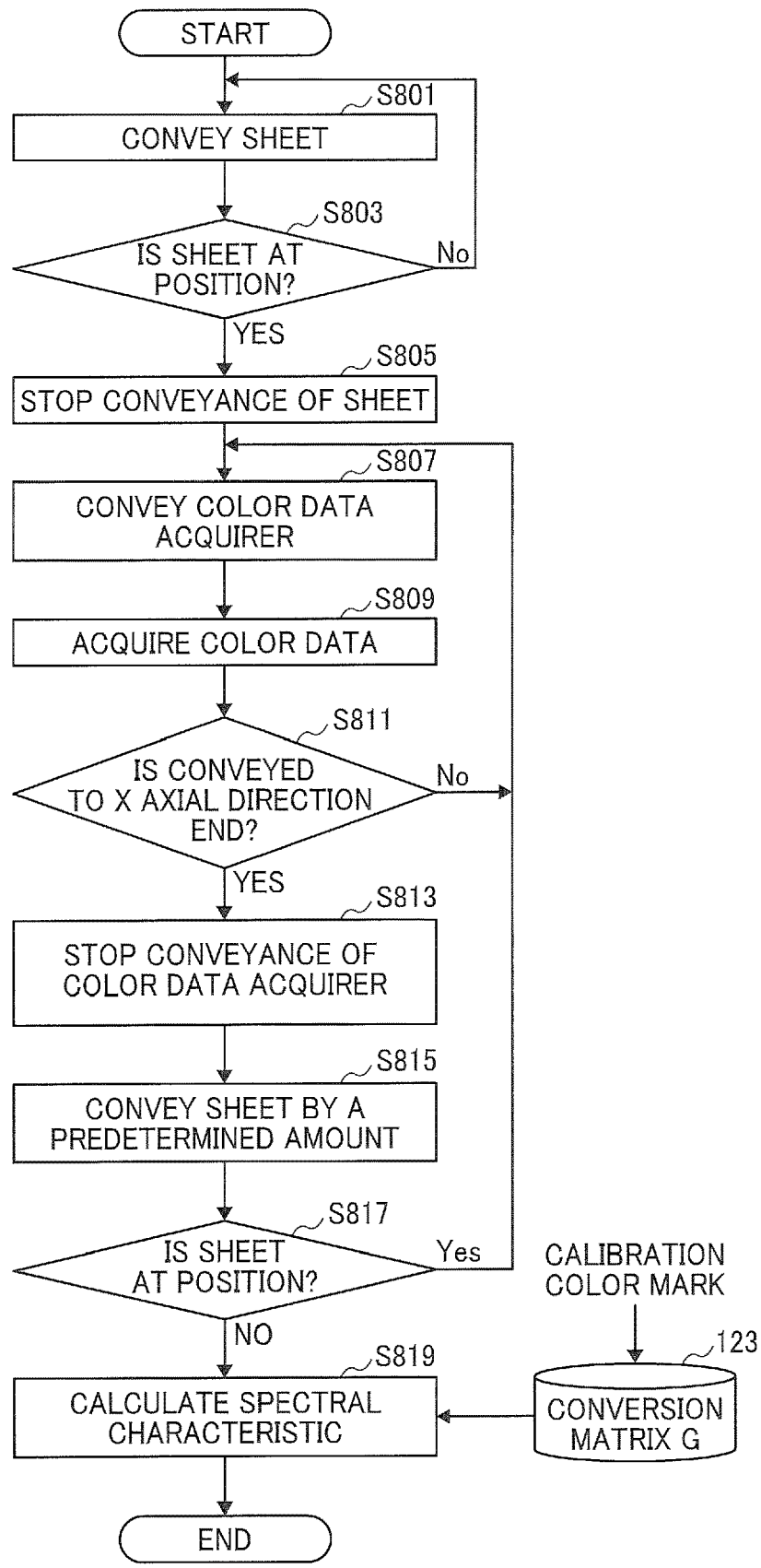
FIG. 8 is a flowchart of an example spectral characteristic acquisition process according to the first embodiment.

Next, an example of a spectral characteristic acquisition process by the spectral characteristic acquisition device 10 will be described with reference to the flow diagram in FIG. 8.

The sheet conveyer 30 conveys the sheet 100 in the Y direction (step S801).

The sheet detector 134 detects whether the sheet 100 is at the position of the color data acquisition area 21 (step S803).

If the sheet 100 is at the position of the color data acquisition area 21 (Yes at step S803), the sheet conveyer 30 stops the conveyance of the sheet 100 in the Y direction (step S805). If the sheet 100 is not at the position of the color data acquisition area 21 (No at step S803), the process returns to step S801.

Subsequently, the color data acquirer conveyer 40 conveys the color data acquirer 20 in the X direction (step S807).

During conveyance of the color data acquirer 20, the spectral unit 80 acquires color data at a predetermined time interval (step S809). The image sensor 84 of the spectral unit 80 images a diffraction image obtained from reflected light of the color data acquisition area 21 and outputs the diffraction image as color data.

If the color data acquirer 20 is conveyed to the X direction end (Yes at step S811), the color data acquirer conveyer 40 stops the conveyance of the color data acquirer 20 (step S813). If the color data acquirer 20 is not conveyed to the X direction end (No at step S811), the process returns to step S807.

Subsequently, the sheet conveyer 30 conveys the sheet 100 in the Y direction by a predetermined amount (step S815).

The sheet detector 134 detects whether the sheet 100 is at the position of the color data acquisition area 21 (step S817).

If the sheet 100 is at the position of the color data acquisition area 21 (Yes at step S817), the process returns to step S807. Meanwhile, if the sheet 100 is not at the position of the color data acquisition area 21 (No at step S817), the spectral characteristic calculator 113 calculates the spectral characteristic of the sheet 100 with the use of the conversion matrix G stored in the conversion matrix storage unit 123 on the basis of the acquired color data (step S819).

In this manner, the spectral characteristic acquisition device 10 can acquire a spectral characteristic. The conveyance by the sheet conveyer 30 and the color data acquirer conveyer 40 is performed in accordance with a drive signal from the motor driver 133.

Next, a calibration function of the conversion matrix G included in the spectral characteristic acquisition device 10 of the present embodiment will be described. In the calibration, the conversion matrix G stored in the conversion matrix storage unit 123 is calibrated on the basis of the color data of a reference color included in the calibration color mark 50.

As such a calibration method, it is conceivable that the color data of a same reference color is acquired by each of the spectral sensors arrayed and provided in the spectral unit 80, and the conversion matrix G is calibrated in such a manner that a same spectral characteristic is calculated by each of the spectral sensors.

However, according to this method, the calibration color mark 50 needs to have a same reference color in a range longer than a length in which the spectral sensors are arrayed. The reference color included in the calibration color mark 50 is called a color mark.

If an array length of the spectral sensors becomes longer, a long color mark is required accordingly, and the color mark may have a non-uniform spectral characteristic such as color unevenness, which may make accurate calibration difficult. In addition, if a calibration color mark 50 including a color mark having a uniform spectral characteristic over a long range is manufactured, a manufacturing cost may be very high.

In the present embodiment, while conveying the calibration color mark 50 in an array direction of a plurality of spectral sensors included in the spectral unit 80, the color data of the color mark is acquired by each spectral sensor. Therefore, the calibration color mark 50 may include a color mark having a length corresponding to a range in which one spectral sensor acquires the color data. With this, a long color mark having a uniform spectral characteristic is unnecessary, and the calibration color mark 50 can be manufactured inexpensively. In addition, since each spectral sensor is calibrated with the use of a same color mark, accurate calibration can be performed with an influence of nonuniformity of spectral characteristics suppressed.

Figure 9:
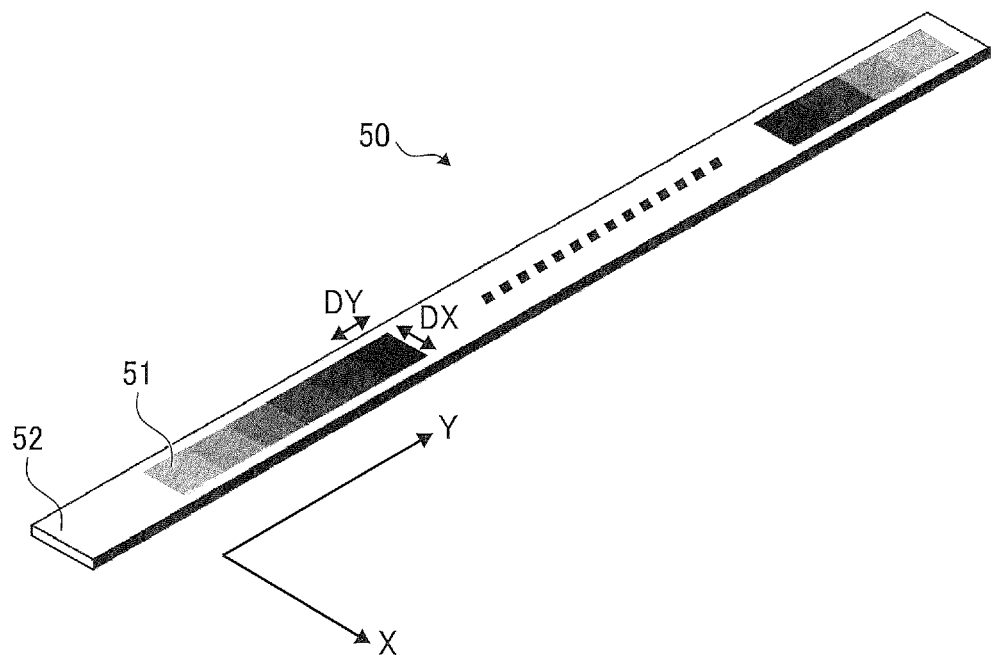
FIG. 9 is an example of a configuration of a calibration color mark according to the first embodiment.

FIG. 9 is a diagram illustrating an example of a configuration of the calibration color mark 50 according to the present embodiment. The calibration color mark 50 includes as a base material a plate-shaped member 52 whose longitudinal direction is the Y direction, and the plate-shaped member is provided with a color mark 51 of a color (reference color) of a known spectral characteristic.

The rectangular color mark 51 illustrated in FIG. 9 is one of color areas of a known spectral characteristic. In the calibration color mark 50, a plurality of color marks 51 having different colors are arrayed in the Y direction within a range of a color gamut of an object. A color of each color mark 51 is a reference color for calibration. In the present embodiment, it is assumed that color marks of several to several thousand colors selected from a color reproducible range of printing of a printing apparatus are used.

A length DX in the X direction and a length DY in the Y direction of one color mark may be larger than an in-plane spatial resolution of color data acquisition by the color data acquirer 20. For example, if the in-plane spatial resolution of color data acquisition is 1 mm, the lengths DX and DY may be 1 mm or more. As the lengths DX and DY are shorter, nonuniformity of the spectral characteristics in an area is suppressed, and thus the lengths DX and DY are preferably shorter.

A material of the plate-shaped member 52 used as a base material is metal, such as aluminum, for example. The calibration color mark 50 is manufactured by printing the color mark 51 directly on a surface of the plate-shaped member 52. Alternatively, a sheet on which the color mark 51 is printed may be attached to the plate-shaped member 52 and manufactured.

It is preferable that a coloring material of the color mark 51 has less fading over time. However, the color mark 51 is not limited to a material colored with paint. For example, ceramic color tiles such as British Ceramic Research Association (BCRA) color tiles most commonly used for applications such as calibration of a spectrophotometer may be used. The plate-shaped member 52 is desirably larger than a size of the color mark 51 such that the color mark 51 is not touched when gripping or carrying. If a number of the color marks 51 used in calibration is large, a plurality of calibration color marks 50 may be prepared.

It is preferable that areas of mutually different colors of the calibration color mark 50 be uniformly selected from a color range, i.e., gamut that can be reproduced by an image in, for example, a color space such as an XYZ color system or L*a*b* color system.

The color mark requires much time and cost for manufacturing, maintenance and measurement. Therefore, in the calibration color mark, the number of color marks may be reduced as much as possible within a range in which the estimation accuracy of a spectral characteristic can be maintained, and several to several tens of color marks selected from a color reproducible range of image formation may be used. However, in order to increase the estimation accuracy of a spectral characteristic and acquire a high-accuracy spectral characteristic, it is preferable that the calibration color mark include color marks of hundreds to thousands of colors. For example, when a plurality of colors of four or more colors are required for achieving high image quality by an electrophotographic method, an inkjet method, or the like, a calibration color mark including color marks of more colors is required. The more colors are colors including orange, green, white, clear, fluorescent color and the like, in addition to yellow, magenta, cyan and black, for example.

Next, an example of a calibration operation of the spectral characteristic acquisition device 10 according to the present embodiment will be described. Each spectral sensor included in the color data acquirer 20 of the spectral characteristic acquisition device 10 includes the conversion matrix G. In the calibration of the spectral characteristic acquisition device 10, the conversion matrix G of each spectral sensor is calibrated by the conversion matrix calculator 112. The conversion matrix calculator 112 is an example of the "calibrator".

Figure 10:
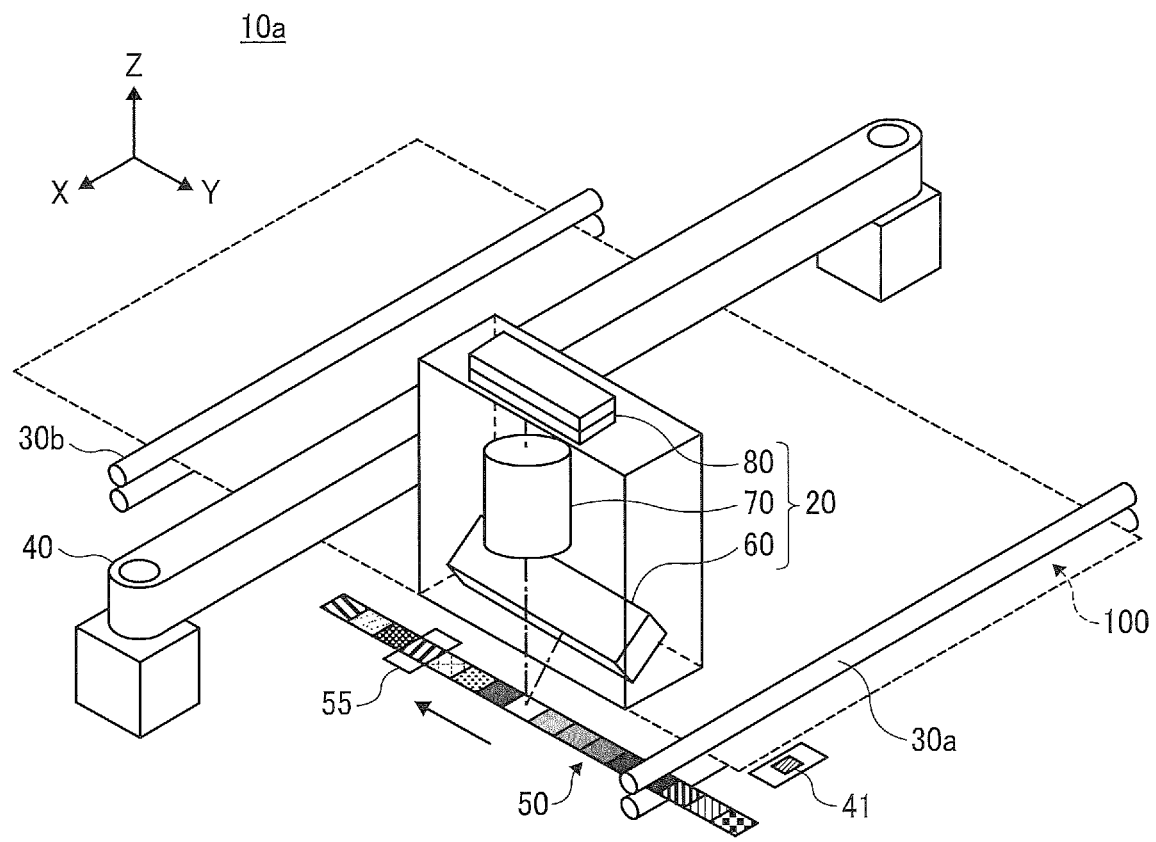
FIG. 10 is an example arrangement of calibration according to the first embodiment.

FIG. 10 is a diagram explaining an example of an arrangement at a time of calibration of the spectral characteristic acquisition device 10 according to the present embodiment. As illustrated in FIG. 10, the calibration color mark 50 is placed in an area where there is no sheet 100 within a range in which the color data acquirer 20 can be conveyed by the color data acquirer conveyer 40. The spectral characteristic of each color mark included in the calibration color mark 50 is measured in advance with the use of a high-precision spectrometer, and a matrix $R_1$ representing a spectral characteristic of the area is stored in the reference data storage unit 121.

At a time of calibration, the color data acquirer 20 is conveyed in the positive X direction and arranged at a position where the calibration color mark 50 is placed as illustrated in FIG. 10. In the following, for convenience of explanation, the position where the calibration color mark 50 is placed may be referred to as a calibration position.

In the arrangement illustrated in FIG. 10, light is irradiated from the line illumination light source 60 to the calibration color mark 50, and each spectral sensor included in the spectral unit 80 images a diffraction image and outputs color data.

Here, an operation in which the m spectral sensors $80_m$ included in the spectral unit 80 acquire color data of the n color marks $51_n$ included in the calibration color mark 50 will be described with reference to FIGS. 10 and 11.

First, the drive roller 30a conveys the calibration color mark 50 in the positive Y direction, and arranges the color mark $51_1$ in a most negative Y direction among the color marks $51_n$ at a position at which color data is acquired by the spectral sensor $80_1$ located in a most positive Y direction among the spectral sensors $80_m$. In the following, for convenience of explanation, a position of such calibration color mark 50 may be referred to as an initial position. At the initial position, the spectral sensor $80_1$ acquires color data of the color mark $51_1$.

Figure 11:
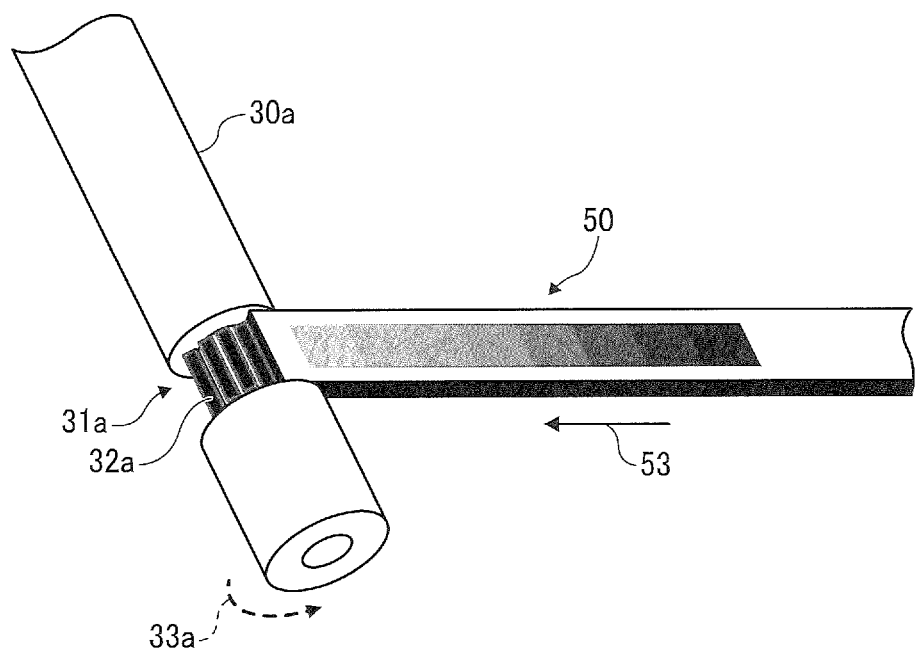
FIG. 11 is an illustration of an example conveyance of a calibration color mark according to the first embodiment.

FIG. 11 is a diagram explaining an example of the conveyance of the calibration color mark 50 by the drive roller 30a. The drive roller 30a includes a cylinder surface that is in contact with the sheet 100, and is rotatable about an axis of the cylinder. A groove 31a is formed in at least a part of the cylinder surface of the drive roller 30a along a circumferential direction. In addition, a plurality of teeth 32a are formed at a bottom portion of the groove 31a. The teeth 32a are, for example, a plurality of teeth substantially parallel to a cylindrical axial direction of the drive roller 30a, and are teeth formed along the circumferential direction of the drive roller 30a.

Meanwhile, a plurality of rack teeth (not shown) are formed so as to be engaged with the teeth 32a on a surface of the calibration color mark 50 on a side in contact with the bottom portion of the groove 31a (surface on a side opposite to a surface provided with the color mark 51). The rack teeth are a plurality of teeth that cross a longitudinal direction of the calibration color mark 50 and are formed along the longitudinal direction of the calibration color mark 50.

The calibration color mark 50 engages with the groove 31a. When the drive roller 30a rotates in a direction indicated by a broken arrow 33a in FIG. 11, the calibration color mark 50 is conveyed in a direction indicated by a solid arrow 53 by the teeth 32a being meshed with the rack teeth. The direction indicated by the solid arrow 53 is the negative Y direction in FIG. 10. In addition, the drive roller 30a is an example of the "cylindrical member". By switching a rotation direction of the drive roller 30a, a conveyance direction of the calibration color mark 50 can be switched.

It is preferable that a groove of the groove 31a is formed having a depth such that a surface on which the color mark 51 of the calibration color mark 50 is provided does not protrude in the positive Z direction (see FIG. 10) with respect to a surface of the sheet 100 when the calibration color mark 50 is engaged and conveyed. In addition, it is desirable that the groove of the groove 31a is formed having a depth such that a surface on which the color mark 51 of the calibration color mark 50 is provided does not contact a roller on the positive Z direction side, that constitutes a nip roller of the drive roller 30a when the calibration color mark 50 is engaged and conveyed.

By providing the groove 31a and engaging the calibration color mark 50 with the groove 31a and conveying the calibration color mark 50, vibration and displacement of the calibration color mark 50 during conveyance can be suppressed, and the calibration color mark 50 can be conveyed in the Y direction in a stable state. This allows accurate calibration. The groove 31a is an example of the "guide section".

The teeth 32a may be formed by directly processing the bottom portion of the groove 31a, or may be formed by attaching a member having a tooth or the like to the bottom of the groove 31a. In addition, a gear having teeth 32a may be attached near an end of the drive roller 30a. Similarly, the rack teeth in the surface of the calibration color mark 50 on a side in contact with the bottom portion of the groove 31a may be formed by directly processing the plate-shaped member 52 of the calibration color mark 50, or may be formed by attaching a member having a tooth or the like to the plate-shaped member 52.

While an example is shown in the present embodiment, in which a driving force due to a rotation of the drive roller 30a is transmitted to the calibration color mark 50 by meshing the teeth 32a with the rack teeth, and the calibration color mark 50 is conveyed, the configuration is not limited to this. For example, friction may be used without using the teeth. In this case, no teeth are formed on the bottom portion of the groove 31a and the surface of the calibration color mark 50, and the driving force by the rotation of the drive roller 30a is transmitted to the calibration color mark 50 by friction. In order to increase a frictional force, the bottom portion of the groove 31a and at least one surface of the calibration color mark 50 may be roughened or uneven.

Referring back to FIG. 10, after the calibration color mark 50 is arranged at the initial position and color data is acquired, the drive roller 30a conveys the calibration color mark 50 in the negative Y direction by a predetermined amount and arranges the color mark $51_2$ adjacent to the color mark $51_1$ at a position at which the color data is acquired by the spectral sensor $20_1$. In this state, the spectral sensor $20_1$ acquires color data of the color mark $51_2$. By repeating such an operation n times, the spectral sensor $20_1$ can acquire $V_1$ storing the color data v. A predetermined amount is, for example, 1 mm.

Meanwhile, when the color mark $51_2$ is arranged at the color data acquisition position of the spectral sensor $80_1$, the color mark $51_1$ is arranged at the color data acquisition position of the spectral sensor $80_2$ adjacent to the spectral sensor $80_1$. Therefore, the color data acquisition of the color mark $51_2$ by the spectral sensor $80_1$ and the color data acquisition of the color mark $51_1$ by the spectral sensor $80_2$ can be performed simultaneously. If this is repeated n times, the matrix $V_1$ by the spectral sensor $80_1$ and the matrix $V_2$ by the spectral sensor $80_2$ can be obtained simultaneously. The same applies to other spectral sensors $80_3$ to $80_m$.

In this manner, each of the m spectral sensors $80_m$ can acquire color data of the n color marks $51_n$. Color data of each spectral sensor is stored in a matrix $V_m$.

The conversion matrix calculator 112 acquires, from the reference data storage unit 121, a matrix $R_{ref}$ representing a spectral characteristic of a reference sample measured in advance and a matrix $R_1$ representing a spectral characteristic of each color mark of the calibration color mark 50, and adds the matrix $R_1$ to the matrix $R_{ref}$ to obtain a matrix $R_{rev}$. In addition, the matrix $V_m$ of color data obtained from the calibration color mark 50 is added to a matrix $V_{mref}$ of color data obtained from the reference sample stored in the color data storage unit 122 to obtain a matrix $V_{mrev}$.

The conversion matrix calculator 112 obtains the conversion matrix $G_m$ on the basis of the formula (5) with the use of the matrices $R_{rev}$ and $V_{mrev}$ thus obtained, and stores the calibrated conversion matrix $G_m$ in the conversion matrix storage unit 123. The spectral characteristic calculator 113 can estimate the spectral characteristic of the sheet 100 with high accuracy by using the conversion matrix $G_m$ thus calibrated for each of the spectral sensors $20_m$.

Figure 12:
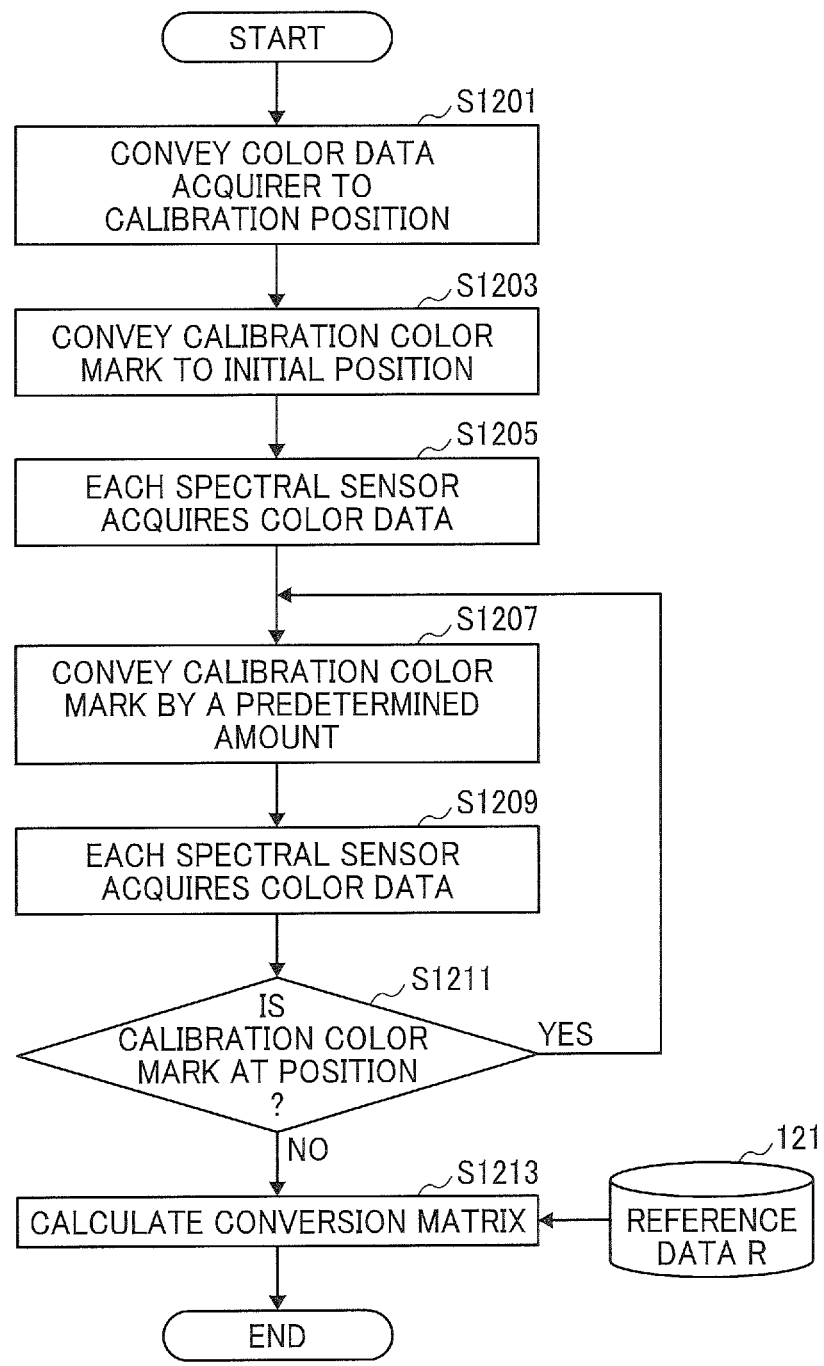
FIG. 12 is a flowchart of a calibration process according to the first embodiment.

FIG. 12 is a flow diagram illustrating an example of a calibration process of a conversion matrix according to the present embodiment.

First, the color data acquirer conveyer 40 conveys the color data acquirer 20 to the calibration position (step S1201). In other words, the color data acquirer conveyer 40 conveys the color data acquirer 20 in the positive X direction (see FIG. 10) to place the color data acquirer 20 at the calibration position.

Subsequently, the drive roller 30a conveys the calibration color mark 50 to the initial position (step S1203). In other words, the drive roller 30a conveys the calibration color mark 50 in the positive Y direction (see FIG. 10), and arranges, the color mark $51_1$ in a most negative Y direction among the color marks $51_n$, at a position at which color data is acquired by the spectral sensor $80_1$ located in a most positive Y direction among the spectral sensors $80_m$.

After the calibration color mark 50 is stopped, each spectral sensor $80_m$ acquires color data of each color mark $51_n$ (step S1205).

After each spectral sensor $80_m$ acquires the color data of each color mark $51_n$, the drive roller 30a conveys the calibration color mark 50 in the negative Y direction by a predetermined amount (step S1207).

After the calibration color mark 50 is stopped, each spectral sensor $80_m$ acquires color data of each color mark $51_n$ (step S1209).

The calibration color mark regulator 135 detects whether the calibration color mark 50 is at the position of the color data acquisition area 21 (step S1211).

If the calibration color mark 50 is not at the position of the color data acquisition area 21 (No at step S1211), the conversion matrix calculator 112 obtains the matrix $V_m$ and refers to the $V_m$ and the matrix R stored in the reference data storage unit 121 to calculate the conversion matrix $G_m$ (step S1213).

Meanwhile, if the calibration color mark 50 is not at the position of the color data acquisition area 21 (Yes at step S1211), the process returns to step S1207.

In this manner, the spectral characteristic acquisition device 10 can calibrate the conversion matrix G.

As described above, in the present embodiment, the color data acquirer conveyer 40 conveys the color data acquirer 20 in the direction (X direction) intersecting the sheet conveyance direction to acquire color data. Even when a width of an image formed on the sheet 100 is wide, color data in an entire width of the image can be acquired without using an expensive light source that can illuminate the entire width of the image at one time. As a result, the spectral characteristic acquisition device 10 capable of acquiring a spectral characteristic with high accuracy can be constructed inexpensively without using an expensive light source.

In addition, in the present embodiment, the color data acquirer 20 includes a plurality of spectral sensors $80_m$ arrayed in the sheet conveyance direction (Y direction). With this, for example, spectral characteristics in a wide range can be acquired at one time in the sheet conveyance direction (Y direction). Further, by causing the conveyance of the color data acquirer 20 to cooperate with the conveyance of the sheet, it is possible to acquire spectral characteristics of a wide area of the sheet at high speed.

In the present embodiment, at the time of calibration, the calibration color mark 50 is conveyed in the sheet conveyance direction (Y direction) to acquire the color data of the calibration color mark 50. With this, even when an array length of the spectral sensors $80_m$ in the color data acquirer 20 is long, an influence of nonuniformity of the spectral characteristics of the calibration color mark 50 can be suppressed, and accurate calibration can be performed. In addition, by using the conversion matrix G calibrated in this manner, it is possible to suppress a difference in each of the spectral sensors $80_m$ and to acquire spectral characteristics with high accuracy.

Second Embodiment

Next, an example of a spectral characteristic acquisition device according to a second embodiment will be described. The description of the same components as those already described in the first embodiment may be omitted.

Figure 13:
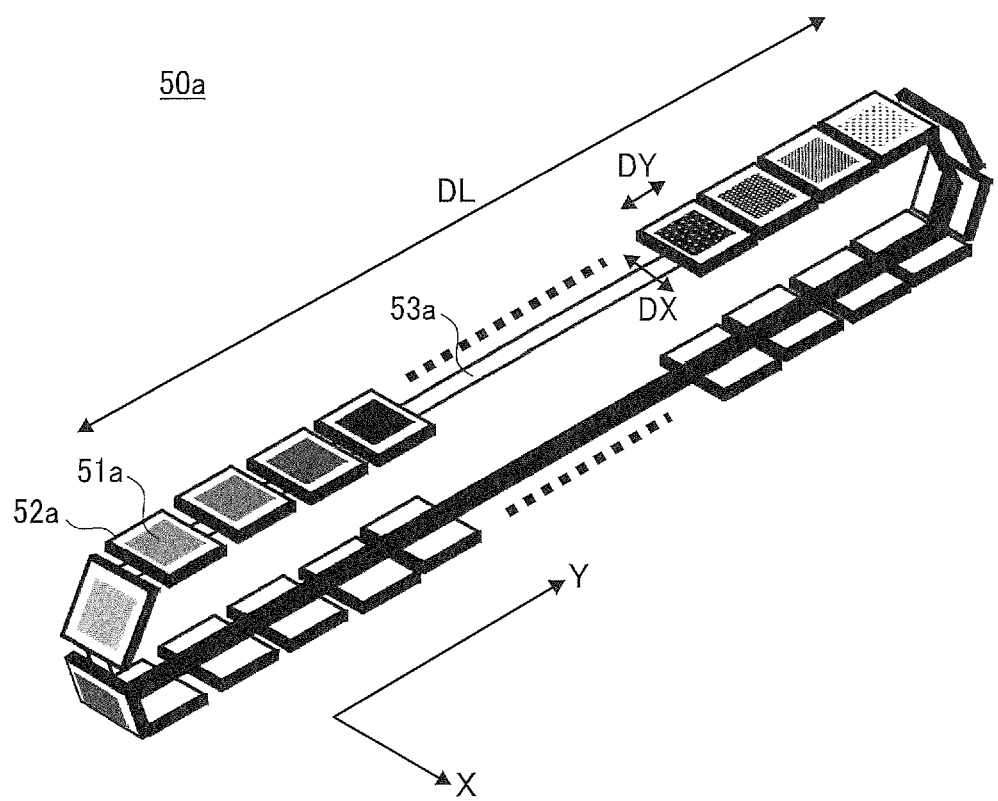
FIG. 13 is an example of a configuration of a calibration color mark according to a second embodiment.

FIG. 13 is a diagram explaining an example of a configuration of a calibration color mark 50a used in a spectral characteristic acquisition device 10a according to the present embodiment.

The calibration color mark 50a is formed by arraying a plurality of substrate members 52a in a longitudinal direction of a belt-shaped member 53a. A material of the substrate member 52a used as a base material is metal, such as aluminum, for example. The belt-shaped member 53a is a belt or the like made of a resin or a cloth, for example. Each of a plurality of substrate members 52a is provided with a color mark 51a of a known spectral characteristic. A different color mark 51a is provided for each of different substrate members 52a.

By providing the color mark 51a on the belt-shaped member 53a, as compared with a case where the color mark is provided on the plate-shaped member as in the calibration color mark 50 according to the first embodiment, twice or more color marks can be provided in a calibration color mark.

A length DX in the X direction and a length DY in the Y direction of one color mark may be larger than an in-plane spatial resolution of color data acquisition by the color data acquirer 20. For example, if the in-plane spatial resolution of color data acquisition is 1 mm, the lengths DX and DY may be 1 mm or more. As the lengths DX and DY are shorter, nonuniformity of the spectral characteristics in an area is suppressed, and thus the lengths DX and DY are preferably shorter.

The calibration color mark 50*a* may be manufactured by directly printing the color mark 51*a* on a surface of the plate-shaped member 52*a*, or may also be manufactured by attaching a sheet on which the color mark 51*a* is printed to the plate-shaped member 52*a*. It is preferable that a coloring material of the color mark 51*a* has less fading over time. However, the color mark 51*a* is not limited to a material colored with paint. For example, ceramic color tiles such as BCRA color tiles most commonly used for applications such as calibration of a spectrophotometer may be used. The plate-shaped member 52*a* is preferably larger than the color mark 51*a* such that the color mark 51*a* is not touched when gripping or carrying. If a number of the color marks 51*a* used in calibration is large, a plurality of calibration color marks 50*a* may be prepared.

Figure 14:
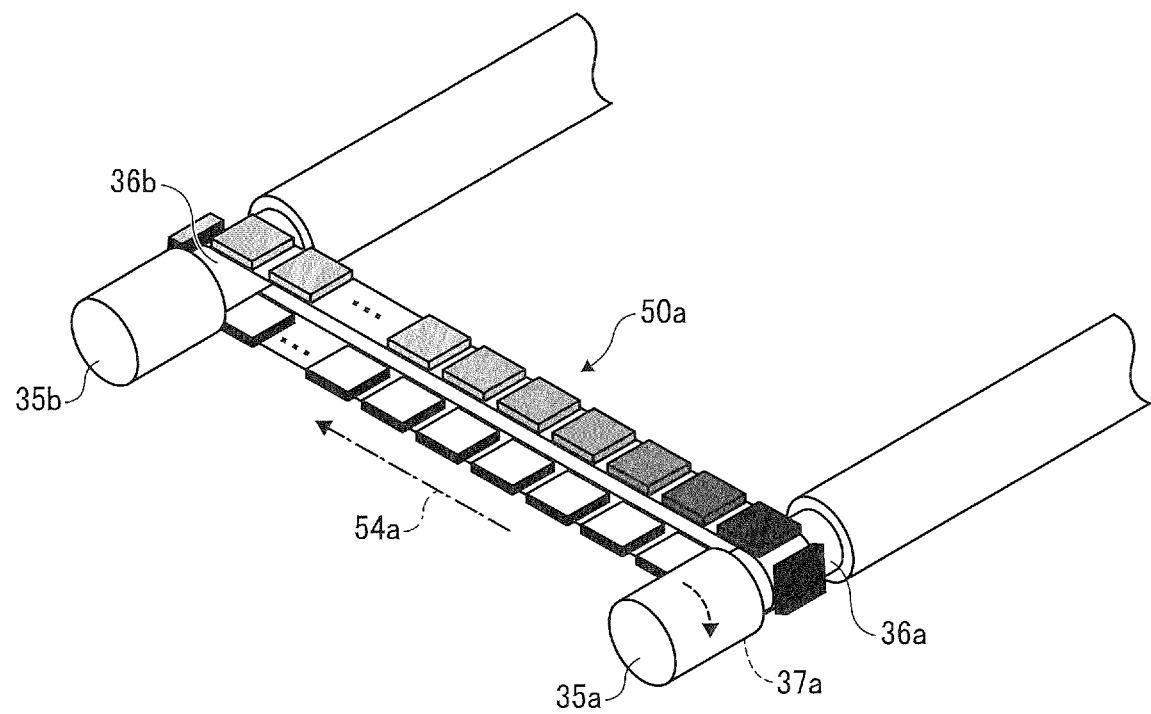
FIG. 14 is an example of placement of the calibration color mark according to the second embodiment.

FIG. 14 is a diagram explaining an example of placement of a calibration color mark 50*a* to the spectral characteristic acquisition device 10*a* according to the present embodiment.

In FIG. 14, the calibration color mark 50*a* is wound around a drive roller 35*a* and a driven roller 35*b*. The drive roller 35*a* is rotated in a direction of an arrow 37*a* indicated by a broken line in FIG. 14 by a rotation of a connected motor. The calibration color mark 50*a* is rotated in a direction of an arrow 54*a* indicated by a dashed line in FIG. 14 by a rotation of the drive roller 35*a*. The driven roller 35*b* rotates in accordance with a rotation of the calibration color mark 50*a*. By using the drive roller 35*a* and the driven roller 35*b*, the calibration color mark 50*a* can be rotated in a tensioned state.

A groove 36*a* is formed on a cylinder surface of the drive roller 35*a*, and a groove 36*b* is formed on a cylinder surface of the driven roller 35*b*. The calibration color mark 50*a* is wound around to engage with the grooves 36*a* and 36*b*. By engaging the calibration color mark 50*a* with the groove 36*a* and the groove 36*a* and winding the calibration color mark 50*a* around, a lateral displacement or the like of the calibration color mark 50*a* due to the rotation can be prevented.

With regard to a length DL of the calibration color mark 50*a* in a longitudinal direction (see FIG. 13), a length of the belt-shaped member 53*a* is adjusted and an interval between the drive roller 35*a* and the driven roller 35*b* in the Y direction is adjusted in such a manner that the length DL becomes at least a length of the color data acquisition area 21 in the Y direction.

Depths of the grooves 36*a* and 36*b* are same as those described for the groove 31*a* in the first embodiment. The grooves 36*a* and 36*b* are each an example of the "guide section".

The calibration color mark 50*a* is disposed at the position of the calibration color mark 50 in FIG. 10 and is used at the time of calibration. A method for using the calibration color mark 50*a* at the time of calibration is same as a method for using the calibration color mark 50.

Figure 15:
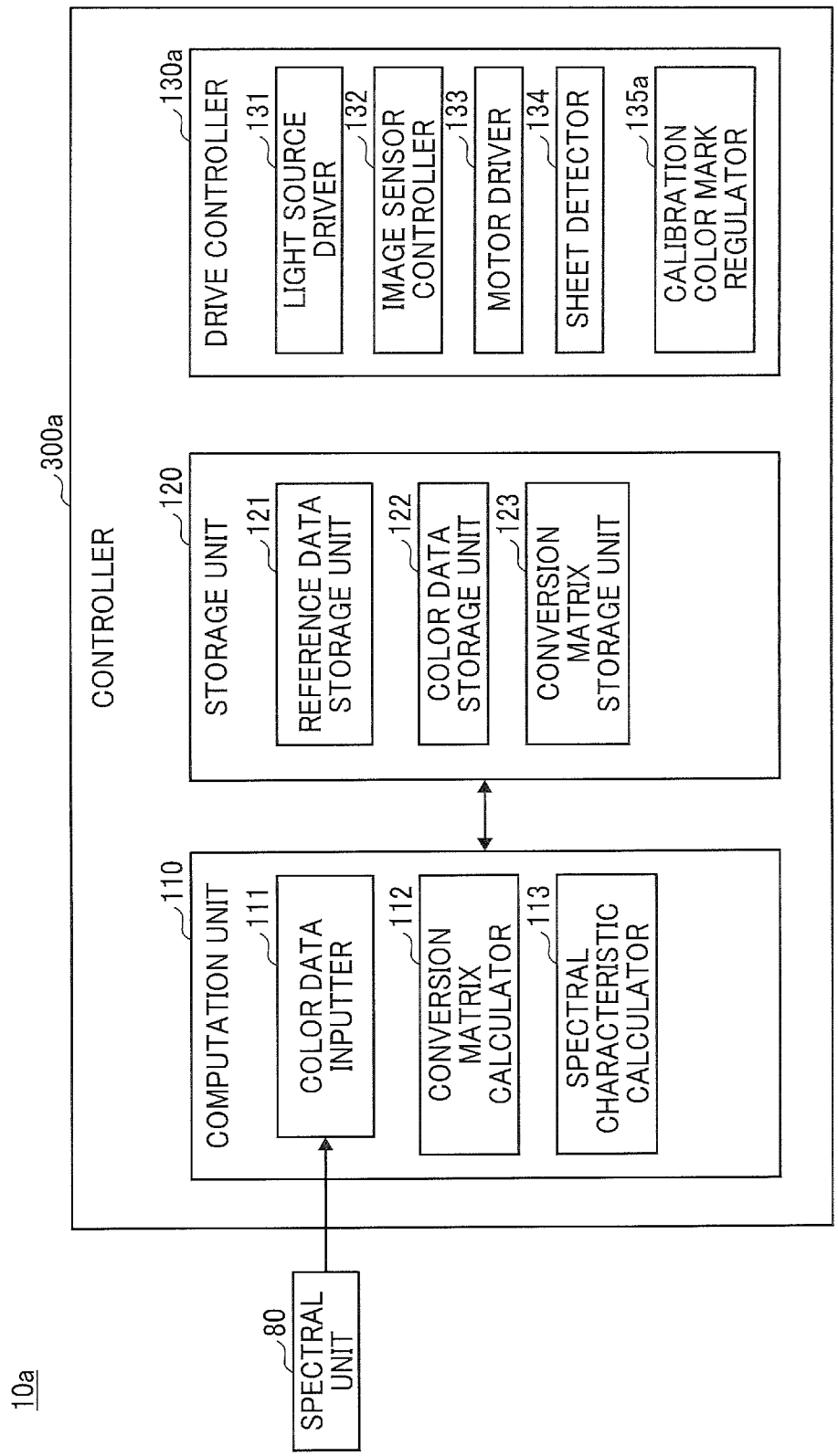
FIG. 15 is a functional block of example components of a controller according to the second embodiment.

FIG. 15 is a diagram illustrating an example of components of a controller 300*a* according to the present embodiment by functional blocks. The controller 300*a* includes a drive controller 130*a*, and the drive controller 130*a* includes a calibration color mark regulator 135*a*.

Here, in a calibration process according to the present embodiment and the calibration process according to the first embodiment, a method for detecting an end timing of the calibration is different. In the first embodiment, since the calibration color mark 50 including a plate-shaped member is used, the calibration color mark detection sensor 55 can detect that the calibration color mark 50 conveyed in the Y direction is not at the position of the color data acquisition area 21 and thus can detect the end timing of the calibration.

However, in the present embodiment, the calibration color mark 50*a* is conveyed in the Y direction while circulating with the use of the calibration color mark 50*a* including a belt-shaped member. Therefore, since any part of the calibration color mark 50*a* is at the position of the color data acquisition area 21 at all times, the calibration color mark detection sensor 55 or the like is not able to detect the calibration end timing.

In the present embodiment, among the plurality of color marks 51*a* included in the calibration color mark 50*a*, a top color mark to be a start of calibration is defined in advance. Then, acquisition of color data for calibration is started from the top color mark, and when the top color mark is circulated and conveyed to the color data acquisition area 21 again, the calibration is ended. Whether the color mark conveyed to the color data acquisition area 21 is the top color mark can be detected on the basis of the color data of the color mark acquired by the spectral sensor.

Referring back to FIG. 15, the calibration color mark regulator 135*a* detects that the top color mark is conveyed to the color data acquisition area 21 as described above, and thus detects the calibration end timing. The calibration color mark regulator 135*a* can be implemented, for example, by the spectral sensor $80_1$ or the like positioned in the most positive direction among the spectral sensors $80_m$ included in the spectral unit 80. The timing for ending the calibration is not limited to a timing when the top color mark circulates once. A number of circulating of the top color mark to finish the calibration may be determined in advance, and the calibration may be ended when the top color mark is circulated a specified number of times. The calibration color mark regulator 135*a* is an example of the "regulator".

Figure 16:
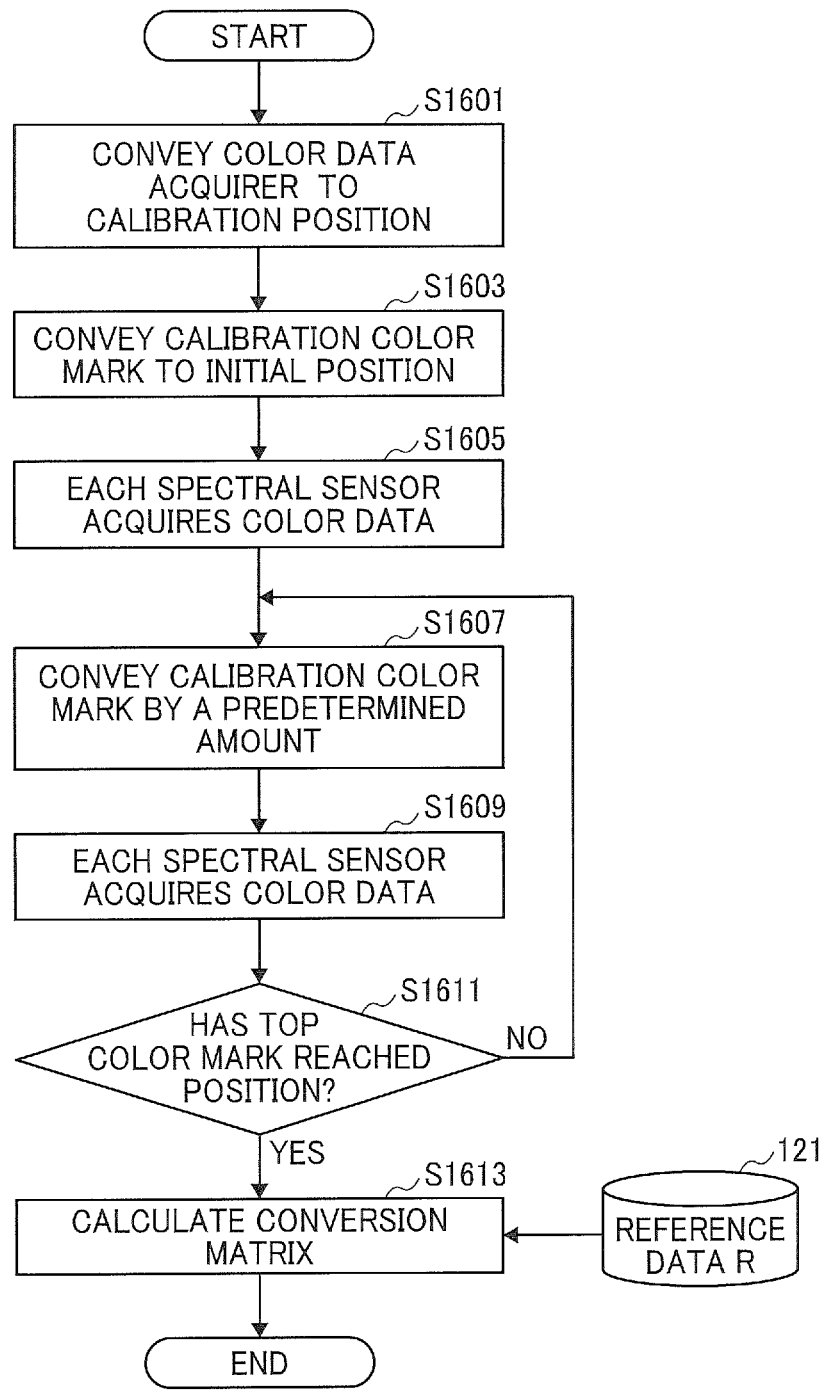
FIG. 16 is a flowchart of a calibration process according to the second embodiment.

FIG. 16 is a flow diagram illustrating an example of a calibration process of the conversion matrix G according to the present embodiment. Steps S1601 to S1609 are similar to steps S1201 to S1209 of the process for calibrating the conversion matrix G according to the first embodiment illustrated in FIG. 12, and thus the description is omitted.

The calibration color mark regulator 135*a* detects whether the top color mark is conveyed to the position of the color data acquisition area 21 (step S1611).

If the top color mark is conveyed to the position of the color data acquisition area 21 (Yes at step S1611), the conversion matrix calculator 112 obtains the matrix $V_m$ and refers to the $V_m$ and the matrix R stored in the reference data storage unit 121 to calculate the conversion matrix $G_m$ (step S1613).

Meanwhile, if the top color mark is not conveyed to the position of the color data acquisition area 21 (No at step S1611), the process returns to step S1607.

In this manner, the spectral characteristic acquisition device 10 can end the calibration with the use of the calibration color mark regulator 135*a* and thus can calibrate the conversion matrix G.

As described above, in the present embodiment, the color marks 51*a* are arrayed in the belt-shaped member 53*a*, and thus the calibration color mark 50*a* is manufactured. With this, it is possible to provide a number of color marks twice or more compared to a case of providing color marks on a plate-shaped member, and to perform calibration using this. Since an acquisition resolution of the spectral characteristics can be increased as the number of the color marks increases, calibration with high accuracy can be performed, and spectral characteristics can be acquired with high accuracy.

For example, the number of color marks can be increased by preparing a plurality of calibration color marks having plate-shaped members and including different color marks and attaching and detaching the calibration color marks to the spectral characteristic acquisition device; however, it takes a lot of man-hours and time to attach and detach the calibration color marks. According to the present embodiment, the process for attaching and detaching the calibration color marks can be eliminated or reduced, and thus it is possible to reduce man-hours and time of calibration.

Other effects are same as the effects described in the first embodiment.

Third Embodiment

Next, an example of a spectral characteristic acquisition device according to a third embodiment will be described. The description of the same components as those already described in the first and second embodiments may be omitted.

Figure 17:
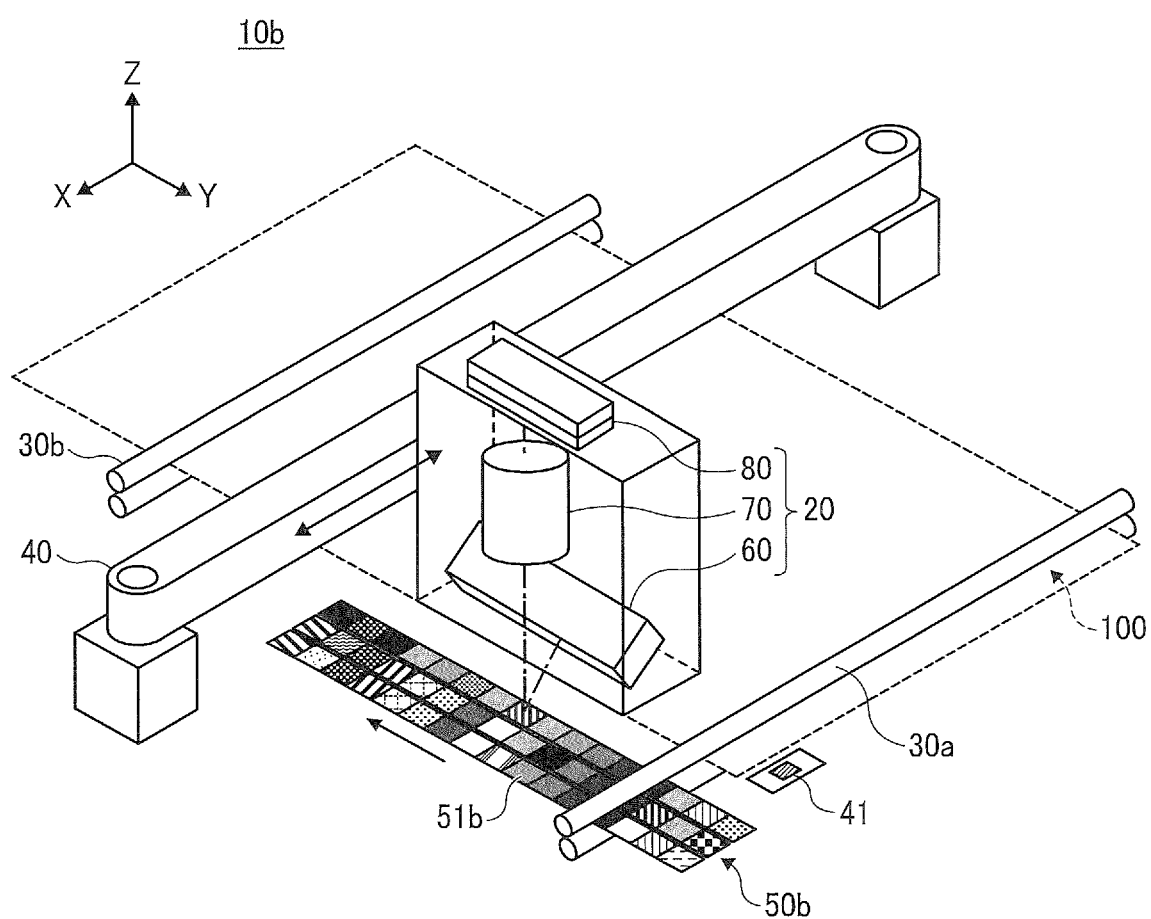
FIG. 17 is an example of an arrangement of calibration according to a third embodiment.

FIG. 17 is a diagram explaining an example of an arrangement of calibration of a spectral characteristic acquisition device 10b according to the present embodiment.

In this embodiment, as illustrated in FIG. 17, a calibration color mark 50b in which a color mark 51b is arrayed and provided in the X direction and in the Y direction respectively is used. In FIG. 17, three color marks 51b are arrayed in the X direction and sixteen color marks 51b are arrayed in the Y direction, respectively. However, the configuration is not limited to this, and an arbitrary number of the color marks 51b may be provided.

The calibration color mark 50b is placed in an area where there is no sheet 100 within a range in which the color data acquirer 20 can be conveyed by the color data acquirer conveyer 40. A function of the calibration color mark 50b and a method for using the calibration color mark 50b are the same as those described in the first or second embodiment, and thus the description is omitted here.

FIGS. 18A to 18D are views explaining an example of a calibration operation by the spectral characteristic acquisition device 10b according to the present embodiment. FIGS. 18A to 18D are plan views of the calibration color mark 50b at the time of calibration as viewed from the positive Z direction. In FIGS. 18A to 18D, each square of a grid illustrated in the calibration color mark 50b indicates the color marks 51b arrayed and provided in the X direction and the Y direction respectively. FIGS. 18A to 18D are views explaining an operation of the color data acquirer 20 at each position of the calibration color mark 50b conveyed in the direction (positive Y direction) indicated by an arrow 54.

Figure 18:
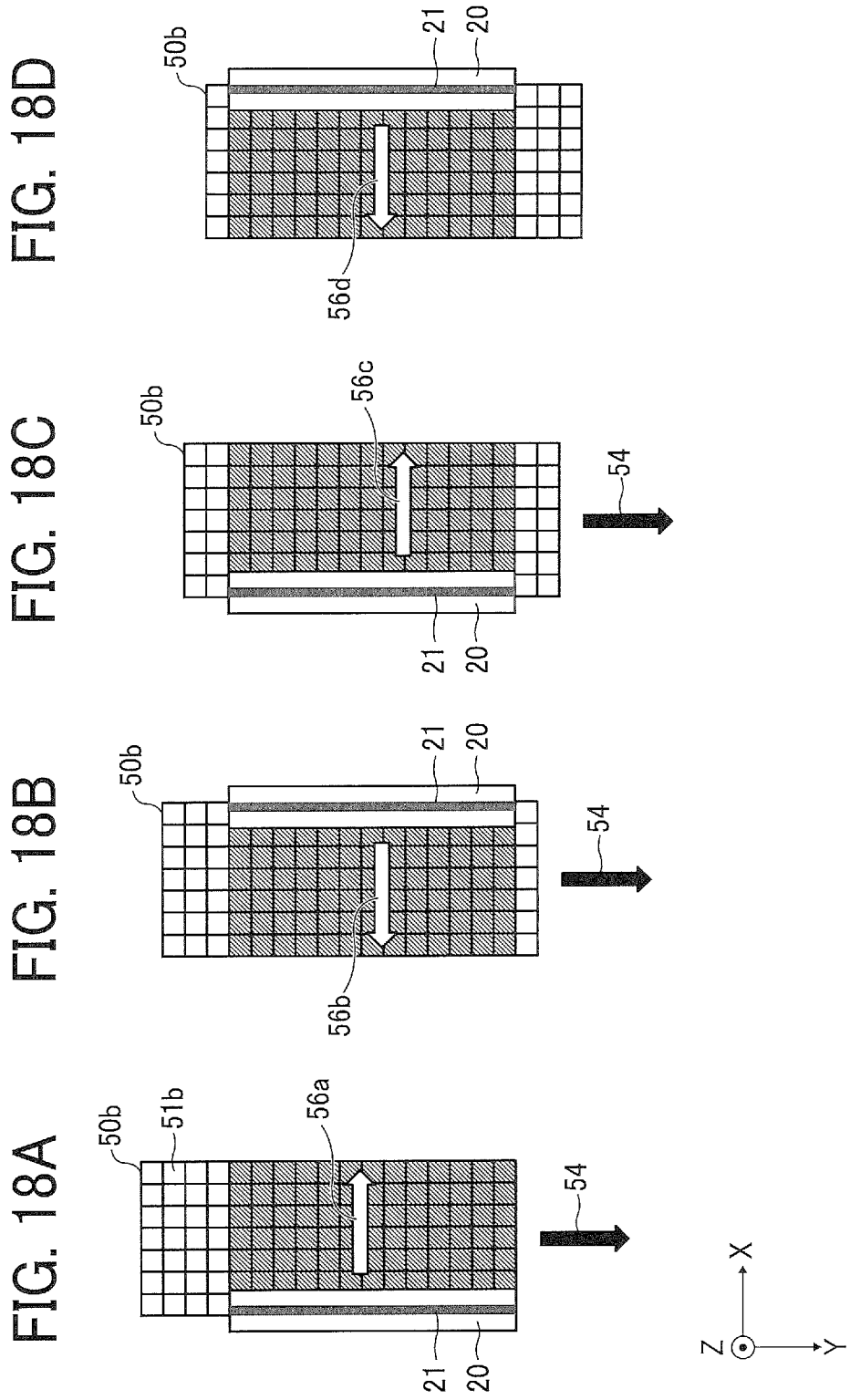
FIGS. 18A to 18D (FIG. 18) are illustrations of a calibration operation according to the third embodiment.

In FIG. 18A, the color data acquirer 20 is located at a negative X direction end and at a positive Y direction end of the calibration color mark 50b. The color data acquirer 20 is conveyed in a direction of a white arrow 56a from a position indicated in FIG. 18A. During conveyance of the color data acquirer 20, the spectral unit 80 acquires color data of the calibration color mark 50b in the color data acquisition area 21 at a predetermined time interval. The predetermined time interval is, for example, a frame period of the image sensor 84. When the spectral unit 80 acquires color data, the calibration color mark 50b is at rest. The color data acquirer 20 is conveyed to the positive X direction end of the calibration color mark 50b and stops.

FIG. 18B illustrates a state after the calibration color mark 50b is conveyed in the Y direction by a predetermined amount from a position of FIG. 18A. The predetermined amount is, for example, a length corresponding to a color data acquisition range in the Y direction of one spectral sensor included in the spectral unit 80, and is 1 mm, for example. In this manner, it is possible to acquire, with each spectral sensor included in the spectral unit 80, a spectral characteristic of a same area of the calibration color mark 50b.

The color data acquirer 20 is conveyed in a direction of a white arrow 56b from a position indicated in FIG. 18B. During conveyance of the color data acquirer 20, the spectral unit 80 acquires color data of the calibration color mark 50b in the color data acquisition area 21 at a predetermined time interval. In a same manner as described above, when the spectral unit 80 acquires color data, the calibration color mark 50b is at rest. The color data acquirer 20 is conveyed to the negative X direction end of the calibration color mark 50b and stops.

The spectral unit 80 acquires color data of the calibration color mark 50b in the color data acquisition area 21 by a same operation also with regard to FIGS. 18C and 18D.

A calibration color mark detection sensor may be provided at a predetermined position in the Y direction to detect at least one of a start timing and an end timing of calibration.

By the above operation, each spectral sensor $80_m$ included in the spectral unit 80 can acquire the color data of all the color marks 51b included in the calibration color mark 50b. While an example in which the color data acquirer 20 is conveyed four times in the X direction to acquire color data of the calibration color mark 50b is illustrated in the above description, a number of conveyances may be arbitrarily set in accordance with a size of the calibration color mark 50b.

FIG. 19 is a diagram illustrating an example of color data of each color mark $51b_n$ acquired by each spectral sensor $80_m$ according to the present embodiment. Each column corresponds to a matrix $V_m$ storing the color data in each spectral sensor.

As described above, in the present embodiment, in the calibration, the calibration color mark 50b in which the color marks 51b are arrayed and provided in the X direction and the Y direction respectively in the plate-shaped member is used. At the time of calibration, the drive roller 30a conveys the calibration color mark 50b in the Y direction. In addition, the color data acquirer conveyer 40 conveys, the color data acquirer 20 in which the spectral sensors $80_m$ are arrayed in the Y direction, in the X direction to acquire color data. As a result, even when a number of the color marks 51b is very large, the color data of the color mark 51b can be acquired in a short time.

In addition, while an example in which the calibration color mark 50b in which the color marks 51b are arrayed and provided in the X direction and the Y direction respectively in the plate-shaped member is used is illustrated in the present embodiment, the configuration is not limited to this. For example, as illustrated in the second embodiment, the calibration color mark 50b in which the color marks 51b are arrayed and provided in the X direction and the Y direction respectively in the belt-shaped member may be used. With this, compared to a case of arraying the color marks 51b in a plate-shaped member, the calibration color mark 50b can include twice or more color marks, and accurate calibration can be performed. In addition, spectral characteristics can be acquired with high accuracy. Furthermore, color data of such a color mark 51b can be acquired in a short time.

Other effects are same as those described in the first and second embodiments.

Forth Embodiment

Next, an example of a spectral characteristic acquisition device according to a forth embodiment will be described.

The description of the same components as those already described in the first to third embodiments may be omitted.

In the spectral characteristic acquisition device, a characteristic of the line illumination light source 60 may change due to an influence of environmental changes such as temperature or aging with time, and even if the sheet 100 is the same, the color data acquired by the spectral unit 80 may change.

In a spectral characteristic acquisition device 10c of the present embodiment, a white color mark and a black color mark are provided in the calibration color mark 50, and a correction factor calculator 114 uses the white and black marks to calculate a correction factor of color data. The spectral characteristic calculator 113 estimates a spectral characteristic with the use of color data multiplied by the correction factor obtained by the correction factor calculator, thereby estimating a spectral characteristic with high accuracy at all times regardless of a change in the line illumination light source 60, or the like.

Backing conditions are determined in accordance with a purpose, such as black backing when used for ISO compliance and calibration, and white backing when creating a color profile for printing. The backing means a backing color at the time of acquiring a spectral characteristic. In the white backing, a white color mark which is a color mark of one white color is used, and in the black backing, a black color mark which is a color mark of one black color is used. The white color mark is, for example, a white film, a white printing paper, or the like. The black color mark is, for example, a black film, a black printing paper, or the like. The white color mark and the black color mark are each provided in the calibration color mark 50 as one of a plurality of color marks included in the calibration color mark 50. The color data acquirer 20 is conveyed to a position of the white color mark or the black color mark in the calibration color mark 50, and the spectral unit 80 acquires color data for obtaining a correction factor.

Reference color data $v_{wref}$ and $v_{bref}$ obtained from the white color mark and the black color mark are measured in advance and stored in the color data storage unit 122 as a reference value.

Figure 20:
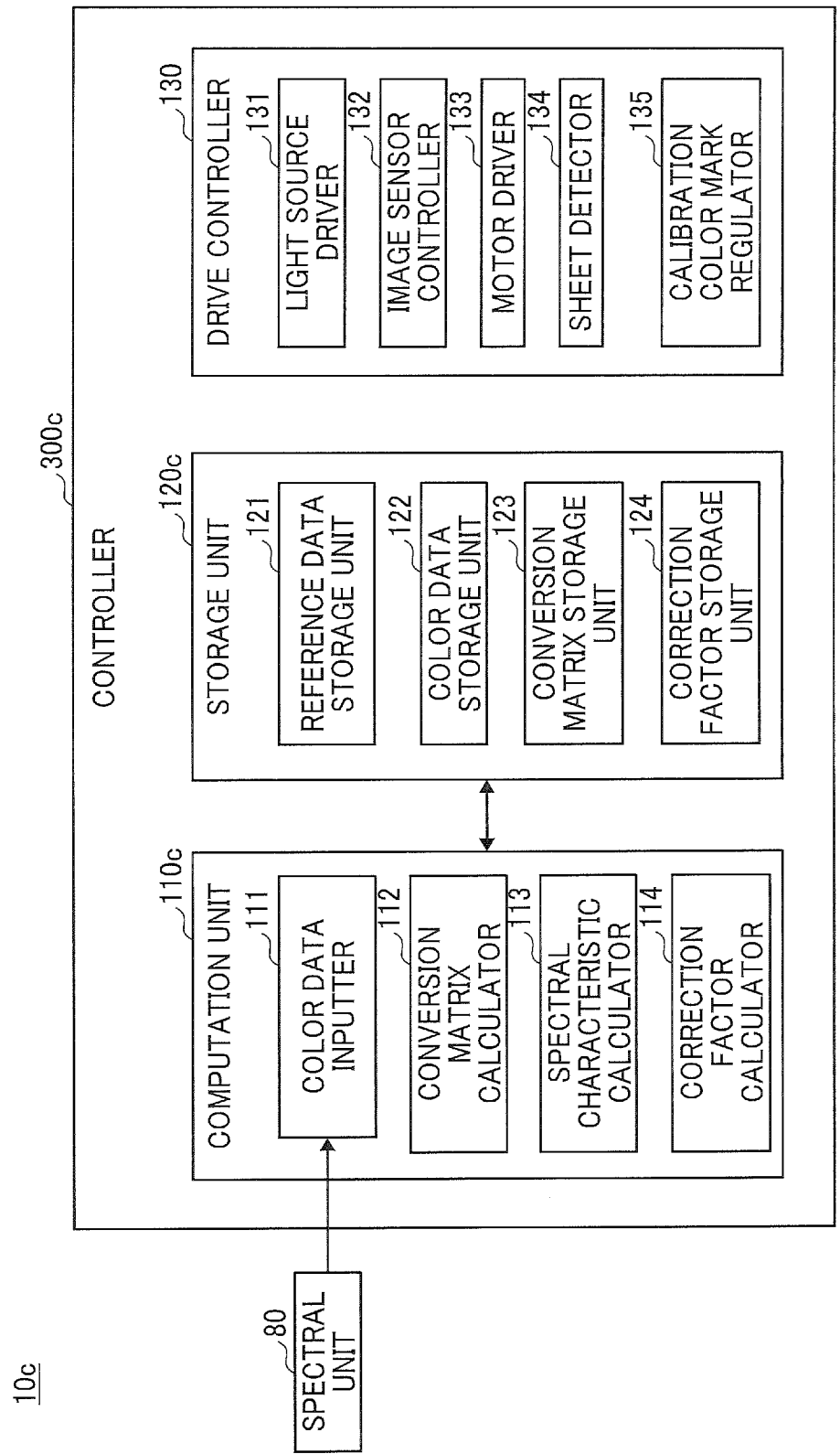
FIG. 20 is a functional block diagram of example components of a controller according to a fourth embodiment.

FIG. 20 is a diagram illustrating an example of components of a controller 300c according to the present embodiment by functional blocks. A computation unit 110c in the controller 300c includes the correction factor calculator 114. In addition, a storage unit 120c includes a correction factor storage unit 124.

The correction factor calculator 114 acquires color data $v_w$ and $v_b$ from the white color mark and the black color mark. In addition, the reference color data $v_{wref}$ and $V_{bref}$ are acquired with reference to the color data storage unit 122. Correction factors w and b are calculated by the following formulae (6) and (7).

$$w_i = v_{wref,i} / v_{W,i} (i=1,2,\ldots,N) \quad (6)$$

$$b_i = V_{bref,i} / V_{b,i} (i=1,2,\ldots,N) \quad (7)$$

The correction factor calculator 114 stores the correction factors w and b in the correction factor storage unit 124.

In a case where the spectral characteristic of the sheet 100 is estimated, when acquiring the color data v of the sheet 100, the spectral characteristic calculator 113 calculates corrected color data v' by the formulae (8) and (9) with the use of the correction factors w and b acquired with reference to the correction factor storage unit 124.

$$v_w' = v \cdot w \quad (8)$$

$$v_b' = b \cdot v \quad (9)$$

In the case of white backing, the spectral characteristic calculator 113 generates a matrix $V_{exp}$ from the color data $v_w'$ corrected by the formula (8), and estimates the spectral characteristic $R_{exp}$ of the sheet 100 by the formula (1) with the use of the conversion matrix G stored in the conversion matrix storage unit 123.

In the case of black backing, the spectral characteristic calculator 113 generates a matrix $V_{exp}$ from the color data $v_b'$ corrected by the formula (9), and estimates the spectral characteristic $R_{exp}$ of the sheet 100 by the formula (1) with the use of the conversion matrix G stored in the conversion matrix storage unit 123.

Figure 21:
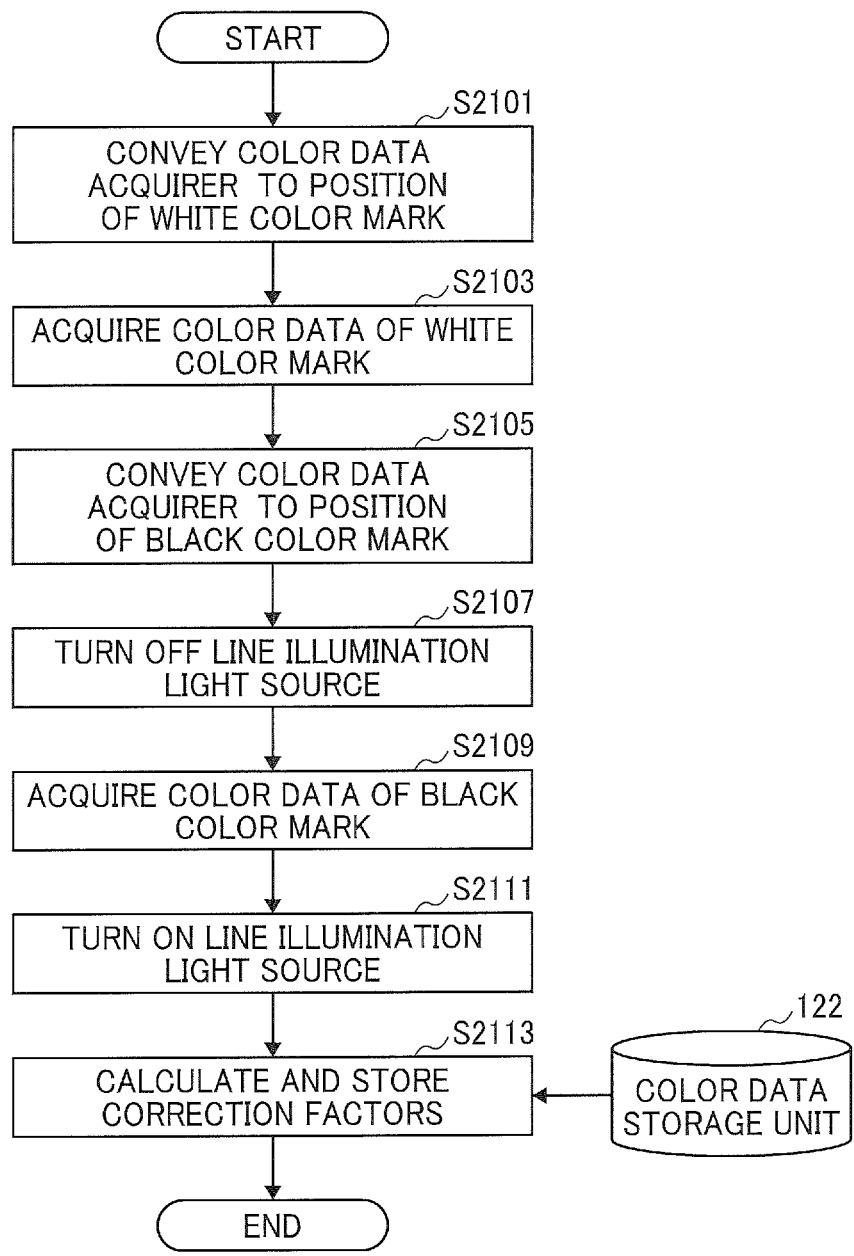
FIG. 21 is a flowchart of a correction factor acquisition process according to the fourth embodiment.

FIG. 21 is a flow diagram illustrating an example of a process of for acquiring a correction factor of color data according to the present embodiment.

First, the color data acquirer conveyer 40 conveys the color data acquirer 20 to a position of the white color mark in the calibration color mark 50 (step S2101).

After the color data acquirer 20 is conveyed and stopped, the spectral unit 80 acquires color data v, of the white color mark (step S2103).

Subsequently, the color data acquirer conveyer 40 conveys the color data acquirer 20 to a position of the black color mark in the calibration color mark 50 (step S2105).

After the color data acquirer 20 is conveyed and stopped, the light source driver 131 turns off the line illumination light source 60 (step S2107). A reason for turning off the line illumination light source 60 is to acquire an output of color data by a dark current. The dark current is a current that flows in a state where light is not irradiated to the pixels of the image sensor 84. For example, when the temperature rises by 7 to 10° C., the dark current is approximately doubled.

Subsequently, the spectral unit 80 acquires the color data $v_b$ of the black color mark (step S2109).

Subsequently, the light source driver 131 turns on the line illumination light source 60 (step S2111). A reason for turning on the line illumination light source 60 is to prepare for acquiring next color data.

Subsequently, the correction factor calculator 114 refers to the color data storage unit 122 to acquire the reference color data $v_{wref}$ and $v_{bref}$, and uses the above formulae (6) to (7) to calculate correction factors w and b, and stores the correction factors w and b in the color data storage unit 122 (step S2113).

In this manner, the spectral characteristic acquisition device 10a can use the white color mark and the black color mark to calculate the correction factors w and b and can store the correction factors w and b.

As described above, in the present embodiment, the color data acquired by the spectral unit 80 is corrected, thereby suppressing a decrease in the estimation accuracy of a spectral characteristic due to a change in the line illumination light source 60, or the like. This makes it possible to estimate spectral characteristics with high accuracy at all times.

In addition, correction for a relatively short-term temporal change has significance as simple calibration. According to the present embodiment, such simple calibration can be carried out without complicated operations.

While simple calibration is described above as a function separated from acquisition of a spectral characteristic, the simple calibration can be easily performed by the conveyance of the color data acquirer 20. Therefore, the simple calibration may be performed, as a part of a process for acquiring the spectral characteristic, each time the spectral characteristic is acquired. This makes it possible to acquire a spectral characteristic with guaranteed accuracy at all times.

Other effects are same as those described in the first to third embodiments.

Fifth Embodiment

Next, an example of an image forming apparatus including the spectral characteristic acquisition device according to the first to fourth embodiments and performing in-line spectral characteristic acquisition and adjustment of an image creation condition or the like will be described. The description of the same components as those already described in the first to forth embodiments may be omitted.

Figure 22:
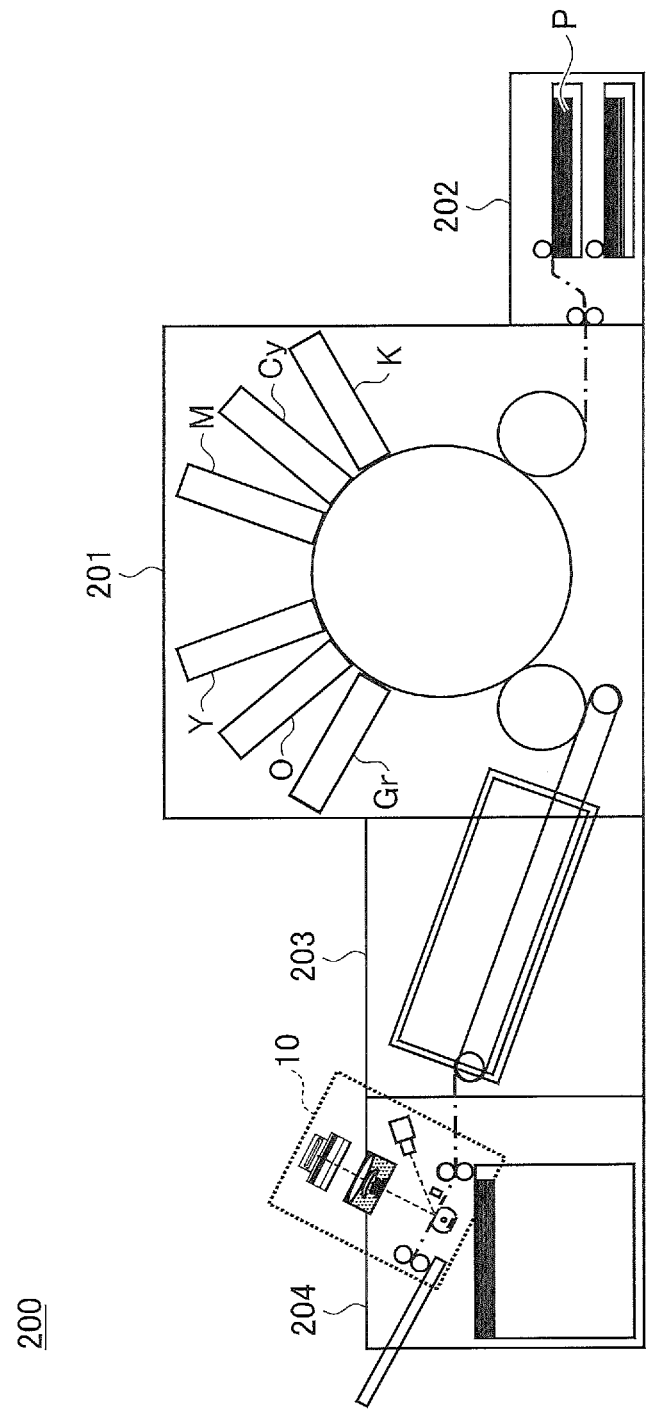
FIG. 22 is an illustration of an example configuration of an image forming apparatus according to a fifth embodiment.

FIG. 22 is a diagram explaining an example of a configuration of the image forming apparatus according to the present embodiment. In FIG. 22, an image forming apparatus 200 is an inkjet type image forming apparatus.

In an image former 201, inkjet heads Gr, O, Y, M, Cy, and K are disposed. Symbols Gr, O, Y, M, Cy and K indicate ink colors of green, orange, yellow, magenta, cyan and black, respectively.

The image forming apparatus 200 is provided with a sheet feeder 202 in which the sheet 100 as an object is housed. The sheet 100 is fed in order from a top sheet, and is conveyed to the image former 201 at timing by a pair of registration rollers.

In the image former 201, an ink is separately applied to the sheet 100 with an inkjet head of a corresponding color on the basis of image information to form a visible image. After being applied with the ink, the sheet 100 is sent to a dryer 203, and the ink is dried during conveyance. The sheet 100 having been dried is ejected by a sheet ejector 204 or stored in a stacker.

In the sheet ejector 204, the spectral characteristic acquisition device 10 is disposed so as to face an image surface of the sheet 100. The image surface of the sheet 100 is an example of the "recording medium surface". The spectral characteristic acquisition device 10 is used for starting up the image forming apparatus 200, changing a sheet type, and performing a periodic inspection during long operation. The spectral characteristic acquisition device 10 acquires a spectral characteristic of image data of the sheet 100 during sheet ejection, and monitors color unevenness and color fluctuation in a sheet surface.

The data acquired by the spectral characteristic acquisition device 10 is sent to a controller of the image forming apparatus 200. The controller functions as an image evaluation device, adjusts an image forming condition such as an application amount of the inkjet head, and adjusts an image creation condition on the basis of on an evaluation result in order to improve color reproducibility.

There are many imaging products on the market, such as printers, copiers, multifunction peripherals which are high value-added products having a communication function with the printers and copiers, and commercial printers. In image forming methods, there are various methods such as an electrophotographic method, an inkjet method, and a heat sensitive method.

In addition, in the field of production printing, digitization is progressed in both sheet machines and continuous sheet machines, and a large number of products such as the electrophotographic type and the inkjet type have been put into the market.

User needs are also increasing in multi-dimensionalization, high definition, and high densification of images in the transition from monochrome printing to color printing. With the progress of diversification of service forms that can be delivered to consumers, such as high-quality printing of photographs, catalog printing, advertisement posting corresponding to personal preference on invoices and the like, demands for high image quality, guarantee of personal information, color reproduction are also increasing.

As a technique for coping with high image quality, there is known an electrophotographic method in which a density sensor for detecting a toner density before being fixed onto an intermediate transfer member or a photoconductor is mounted to stabilize a toner supply amount.

With regard to guarantee of personal information, there is known a technique in which an output image is captured by a camera or the like without an image forming method and the output image is inspected by difference detection by character recognition and an inter-image difference.

Products that output a color toner pattern and perform spectral characteristic acquisition of one or more points to carry out calibration by a spectral characteristic acquisition device such as a spectroscopic measurement device are put into the market.

It is desirable that the present embodiment be performed on an entire area of an image formed by the image forming apparatus in order to cope with an image fluctuation between pages and within a page.

While an example in which the spectral characteristic acquisition device 10 is provided inside the image forming apparatus 200 is described above, the spectral characteristic acquisition device 10 may be provided separately from the image forming apparatus 200 to configure an image forming system. In other words, an imaging system that can acquire and evaluate a spectral characteristic off-line may be configured.

In this case, the image forming apparatus 200 forms an image on a sheet. A user carries, for example, the sheet on which the image is formed to a position where the spectral characteristic acquisition device 10 is provided. Then, the spectral characteristic acquisition device 10 acquires a spectral characteristic of the image formed on each sheet. An acquisition result is fed back to the image forming apparatus 200 off-line, and an image forming condition and an image creation condition of the image forming apparatus are adjusted.

While an example of applying the spectral characteristic acquisition device 10 according to the first embodiment is described above, the spectral characteristic acquisition device 10a according to the second embodiment, the spectral characteristic acquisition device 10b according to the third embodiment, or the spectral characteristic acquisition device 10c according to the fourth embodiment may be applied.

Sixth Embodiment

Next, an example of an image forming apparatus management system which includes the spectral characteristic acquisition device of the first to fourth embodiments and manages an image forming apparatus will be described. The description of the same components as those already described in the first to fifth embodiments may be omitted.

Figure 23:
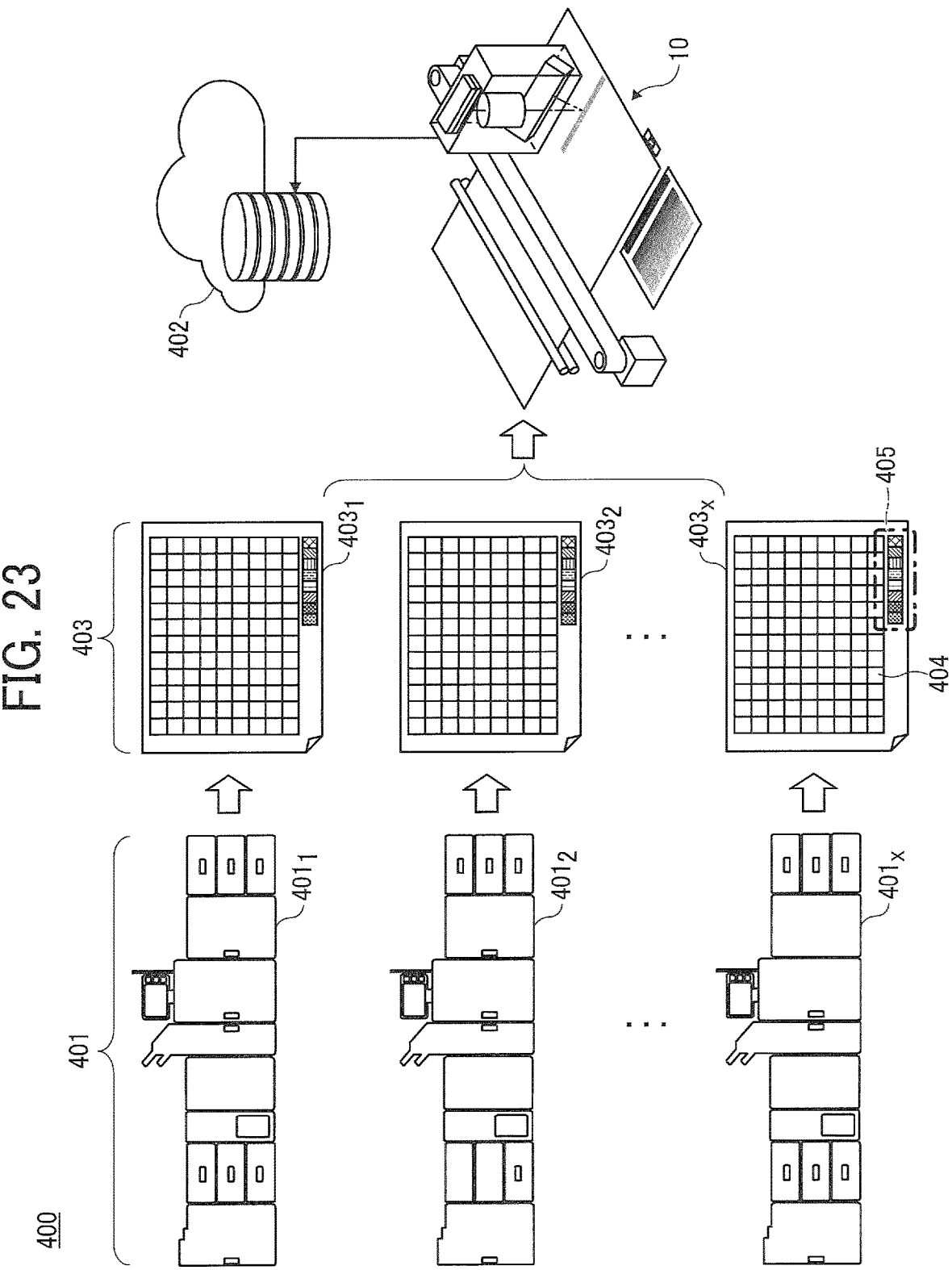
FIG. 23 is an example of an image forming apparatus management system according to a sixth embodiment.

FIG. 23 illustrates an example of a configuration of an image forming apparatus management system 400 of the present embodiment. The image forming apparatus management system 400 includes a spectral characteristic acquisition device 10, a plurality of image forming apparatuses $401_1$ to $401_x$, and a management server 402. The image forming apparatuses $401_1$ to $401_x$ are inkjet type image forming apparatuses.

The spectral characteristic acquisition device 10 is used for starting up, changing a sheet type, or performing a periodic image quality inspection of the image forming apparatuses $401_1$ to $401_x$ during a long operation. The spectral characteristic acquisition device 10 acquires spectral characteristics of images formed on sheets $403_1$ to $403_x$ by the image forming apparatuses $401_1$ to $401_x$, and monitors color unevenness and color fluctuations of the images due to the image forming apparatuses $401_1$ to $401_g$.

The image forming apparatuses $401_1$ to $401_x$ form color patches $404_1$ to $404_x$ for acquiring spectral characteristics on the sheets $403_1$ to $403_x$ in the image quality inspection. In addition to the color patches, color codes $405_1$ to $405_x$ are formed in a predetermined area on the sheet 403.

In the following, for convenience of explanation, the image forming apparatuses $401_1$ to $401_x$ may be collectively referred to as an image forming apparatus 401. In addition, the sheets $403_1$ to $403_x$ may be collectively referred to as the sheet 403, and the color codes $405_1$ to $405_x$ may be collectively referred to as a color code 405.

The color patch 404 is a patch in which a plurality of different color figures are two-dimensionally arrayed, and is used as a color reference. The spectral characteristic acquisition device 10 acquires a spectral characteristic of the color patch 404 formed by the image forming apparatuses $401_1$ to $401_x$. The spectral characteristic of the image by the image forming apparatuses $401_1$ to $401_x$ is evaluated with the use of the acquired spectral characteristic.

Ideally, the color patch $404_1$ formed by the image forming apparatus $401_1$, the color patch $404_2$ formed by the image forming apparatus $401_2$, and the color patch $404_x$ formed by the image forming apparatus $401_x$ all have a same spectral characteristic. However, due to a difference in image creation characteristics of the image forming apparatuses $401_1$ to $401_x$, the spectral characteristics become slightly different. Such a color patch 404 is an example of the "predetermined pattern".

Figure 24:
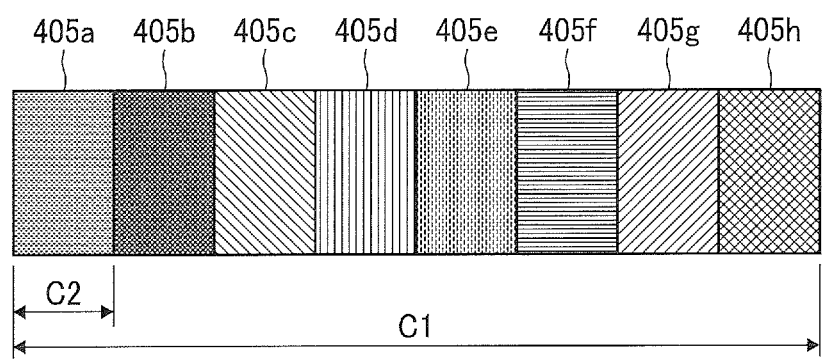
FIG. 24 is an example of a color code according to the sixth embodiment.

The color code 405 is a color figure which is for expressing identification information, and in which color figures having a unique color are one-dimensionally arrayed. FIG. 24 illustrates an example of the color code 405. In FIG. 24, textures 405a to 405h indicate color figures of respective different colors. The color code 405 is an example of the "identification information identifying the image forming apparatus".

A color of one color figure can be expressed by a blending ratio of red, blue and green. Therefore, for example, the color code 405 can be used as identification information including various pieces of information by expressing the blending ratio of red, blue, and green in a character string of hexadecimal numbers and digitizing the character string.

The information indicated by the color code 405 includes, for example, a model name of the image forming apparatus 401, a product number, a date and a time when the color code 405 is formed, a number of sheets in which the color code 405 is formed, and the like.

It is desirable that an entire size C1 of the color code 405 in the sheet conveyance direction is a size included in the color data acquisition area 21 by the spectral characteristic acquisition device 10. In addition, it is desirable that a size C2 per one color of the color code 405 be larger than a color data acquisition area by one spectral sensor included in the color data acquirer 20.

The sheet $403_1$ on which the image forming apparatus $401_1$ forms an image, the sheet $403_2$ on which the image forming apparatus $401_2$ forms an image, and the sheet $403_x$ on which the image forming apparatus $401_x$ forms an image are delivered to one spectral characteristic acquisition device 10.

The spectral characteristic acquisition device 10 acquires the spectral characteristics of the color patches $404_1$ to $404_x$. In addition, the spectral characteristic acquisition device 10 acquires a spectral characteristic of the color code $405_1$ formed on the sheet $403_1$, a spectral characteristic of the color code $405_2$ formed on the sheet $403_2$, and a spectral characteristic of the color code $405_x$ formed on the sheet $403_x$ and acquires identification information.

The spectral characteristic data and the identification information expressed by the color code 405 are associated with each other and stored in the management server 402. The management server 402 is an example of the "storage device".

FIG. 25 is a flow diagram illustrating an example of a management process by the image forming apparatus management system of the present embodiment.

First, an image forming apparatus $401_j$ forms a color patch $404_j$ on a sheet $403_j$ (step S2501). The j is a natural number of 1 to x and is a counter of a number of the image forming apparatuses 401. The x is a number of the image forming apparatuses 401 included in the image forming apparatus management system 400. Step S2501 is an example of a "pattern formation process".

Subsequently, the image forming apparatus $401_j$ forms a color code $405_j$ on the sheet $403_j$ (step S2503).

Subsequently, the counter of the number of the image forming apparatuses 401 is incremented by 1 (step S2505). The management server 402, for example, updates this counter. Alternatively, the updating may be performed by a user who uses the image forming apparatus.

Subsequently, it is determined whether j≤x is satisfied (step S2507). For example, it is determined whether all the image forming apparatuses have formed the color patch 404 and the color code 405 on a sheet. The management server 402, for example, makes this determination. Alternatively, the updating may be performed by a user who uses the image forming apparatus.

If it is determined that j≤x is satisfied (Yes at step S2507), the process returns to step S2501. Meanwhile, when it is determined that j≤x is not satisfied (No at step S2507), the spectral characteristic acquisition device 10 acquires a spectral characteristic of the color patch $404_j$ of the sheet $403_j$ (step S2509).

Subsequently, the spectral characteristic acquisition device 10 acquires identification information of the color code $405_j$ of the sheet $403_j$ (step S2511).

Subsequently, a counter of a number of the sheets 403 is incremented by 1 (step S2513). The management server 402, for example, updates this counter. Alternatively, the updating may be performed by a user who uses the image forming apparatus.

Subsequently, it is determined whether j≤x is satisfied (step S2515). For example, it is determined whether all the spectral characteristic acquisition devices 10 have acquired the spectral characteristics of the color patches 404 of all the sheets and the identification information of the color code 405. The management server 402, for example, makes this determination. Alternatively, the updating may be performed by a user who uses the image forming apparatus.

If it is determined that j≤x is satisfied (Yes at step S2515), the process returns to step S2509. Meanwhile, when it is determined that j≤x is not satisfied (No at step S2515), the management server 402 associates and stores a spectral characteristic of the color patch 404 and identification information of the color code 405 (step S2517). The step S2517 is an example of a "storing process".

As described above, the management system 400 can associate and store the spectral characteristic of the color patch 404 and the identification information of the color code 405 in the management server 402.

According to the present embodiment, for example, by referring to the management server 402, it is possible for a user to grasp spectral characteristic data of the image forming apparatus 401 represented by identification information. In addition, by referring to the management server 402, it is possible to acquire spectral characteristic data of each image forming apparatus represented by identification information, and to adjust an image creation condition of each image forming apparatus on the basis of the spectral characteristic data. While an example of applying the spectral characteristic acquisition device 10 according to the first embodiment is described above, the spectral characteristic acquisition device 10a according to the second embodiment, the spectral characteristic acquisition device 10b according to the third embodiment, or the spectral characteristic acquisition device 10c according to the fourth embodiment may be applied.

In addition, while the inkjet type image forming apparatus is described above as an example, the present embodiment is also applicable to various types of image forming apparatuses such as an electrophotographic type.

While the spectral characteristic acquisition device, the image forming apparatus, the image forming system, the image forming apparatus management system, and the image forming apparatus management method according to the embodiment have been described above, embodiments of the present disclosure is not limited to the abovementioned embodiments, and various modifications and improvements are possible within the scope of the embodiments of the present disclosure.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A spectral characteristic acquisition device comprising:
a color data acquirer including a plurality of spectral sensors configured to receive light reflected from an object irradiated with light and acquire color data of the object;
a calibration color mark member including a base and a plurality of color marks of respective known spectral characteristics provided on the base;
circuitry configured to
estimate a spectral characteristic of the object on a basis of the acquired color data of the object, and
calibrate a spectral characteristic calculator of the circuitry on a basis of color data obtained from the calibration color mark member;
a first conveyer configured to convey the color data acquirer in a direction intersecting a predetermined conveyance direction in which the object is conveyed; and
a second conveyer configured to convey the calibration color mark member in the predetermined conveyance direction,
wherein the plurality of spectral sensors are arrayed in the predetermined conveyance direction and configured to receive light reflected from the plurality of color marks and acquire color data of the plurality of color marks as the color data obtained from the calibration color mark member as the second conveyor conveys the calibration color mark member in the predetermined conveyance direction.

2. The spectral characteristic acquisition device according to claim 1, wherein the circuitry is configured to estimate the spectral characteristic of the object on a basis of the color data of the object with a use of a conversion matrix set in advance, and calibrate the conversion matrix on a basis of the color data obtained from the calibration color mark member.

3. The spectral characteristic acquisition device according to claim 1, wherein the second conveyer is configured to convey the object in the predetermined conveyance direction.

4. The spectral characteristic acquisition device according to claim 1, comprising a third conveyer configured to convey the object in the predetermined conveyance direction.

5. The spectral characteristic acquisition device according to claim 1, wherein the calibration color mark member is at least one of a plate-shaped member and a belt-shaped member in which the plurality of color marks are arrayed on the base in the predetermined conveyance direction.

6. The spectral characteristic acquisition device according to claim 1, wherein the calibration color mark member is at least one of a plate-shaped member and a belt-shaped member in which the plurality of color marks are arrayed on the base in the predetermined conveyance direction and in the direction intersecting the predetermined conveyance direction.

7. The spectral characteristic acquisition device according to claim 1, wherein the second conveyer includes a guide section to guide the conveyance of the calibration color mark member in the predetermined conveyance direction.

8. The spectral characteristic acquisition device according to claim 7, wherein the second conveyer is configured to convey the object in the predetermined conveyance direction and includes a cylindrical member including a cylindrical surface to contact the object, the cylindrical member being rotatable about an axis thereof, and wherein the guide section comprises a groove formed in at least a part of the cylindrical surface in a circumferential direction of the cylindrical member.

9. The spectral characteristic acquisition device according to claim 8, wherein the groove includes a bottom portion having a plurality of teeth formed in the circumferential direction of the cylindrical member, and wherein the calibration color mark member engaged with the groove comprises a plurality of rack teeth configured to mesh with the plurality of teeth in a surface on a side in contact with the bottom portion of the groove.

10. The spectral characteristic acquisition device according to claim 1, wherein the circuitry is further configured to regulate the conveyance of the calibration color mark member in the predetermined conveyance direction.

11. An image forming apparatus for changing an image forming condition on a basis of a spectral characteristic of a recording medium surface, the image forming apparatus comprising the spectral characteristic acquisition device according to claim 1.

12. An image forming apparatus management system comprising:
- an image forming apparatus for forming a predetermined pattern on a recording medium;
- the spectral characteristic acquisition device according to claim 1, configured to acquire a spectral characteristic of the predetermined pattern; and
- a storage device configured to associate and store identification information identifying the image forming apparatus and the spectral characteristic of the predetermined pattern.

13. The spectral characteristic acquisition device according to claim 1, wherein the respective known spectral characteristics of the plurality of color marks are different from each other.

14. The spectral characteristic acquisition device according to claim 1, wherein the base of the calibration color mark member is metal.

* * * * *